US007684502B2

(12) United States Patent
Kurobe et al.

(10) Patent No.: US 7,684,502 B2
(45) Date of Patent: Mar. 23, 2010

(54) COMMUNICATION NETWORK SYSTEM, AND TRANSMISSION/RECEPTION APPARATUS, METHOD AND INTEGRATED CIRCUIT FOR USE THEREIN

(75) Inventors: Akio Kurobe, Tondabayashi (JP); Shigeo Yoshida, Takatsuki (JP); Tomohiro Kimura, Hirakata (JP); Yuji Igata, Chikushino (JP); Masahiro Maki, Kasuya-gun (JP); Toshiyuki Wakisaka, Iizuka (JP); Hisao Koga, Chikushi-gun (JP); Mutsuhiko Oishi, Iizuka (JP)

(73) Assignee: Panasonic Corporation, Osaka (JP)

( * ) Notice: Subject to any disclaimer, the term of this patent is extended or adjusted under 35 U.S.C. 154(b) by 1492 days.

(21) Appl. No.: 10/895,379

(22) Filed: Jul. 21, 2004

(65) Prior Publication Data

US 2005/0018784 A1    Jan. 27, 2005

(30) Foreign Application Priority Data

Jul. 25, 2003  (JP) .......................... 2003-280164
May 21, 2004  (JP) .......................... 2004-152263

(51) Int. Cl.
*H04K 1/00* (2006.01)
*H04L 27/28* (2006.01)

(52) U.S. Cl. ..................... 375/260; 375/219; 370/204
(58) Field of Classification Search ............... 375/260, 375/257, 219; 370/204
See application file for complete search history.

(56) References Cited

U.S. PATENT DOCUMENTS

| | | | | |
|---|---|---|---|---|
| 5,764,699 A | * | 6/1998 | Needham et al. | 375/261 |
| 6,654,384 B1 | * | 11/2003 | Reza et al. | 370/469 |
| 6,754,169 B2 | * | 6/2004 | Baum et al. | 370/204 |
| 6,891,858 B1 | * | 5/2005 | Mahesh et al. | 370/480 |
| 7,158,473 B2 | * | 1/2007 | Kurobe et al. | 370/204 |
| 2002/0090962 A1 | | 7/2002 | Struhsaker et al. | |

FOREIGN PATENT DOCUMENTS

CN        1321377        11/2001

(Continued)

OTHER PUBLICATIONS

Sobia Baig et al., "A Discrete Multitone Transceiver at the Heart of the PHY Layer of an In-Home Power Line Communication Local Area Network", IEEE Communications Magazine, Apr. 2003, pp. 48-53.

(Continued)

*Primary Examiner*—Temesghen Ghebretinsae
(74) *Attorney, Agent, or Firm*—Wenderoth, Lind & Ponack, L.L.P.

(57) ABSTRACT

A communication network system sets communication parameters which enable an operation under a maximum possible communication rate in a situation where a transmission path has cyclic noise/impedance fluctuations. A transmission/reception apparatus transmits training packets for checking the state of the power line at two distinct points in time. A transmission/reception apparatus analyzes SNR at each carrier frequency, and stores an SNR evaluation result. The transmission/reception apparatus compares two SNR evaluations results which are obtained through two instances of a channel estimation algorithm, selects an SNR evaluation result which dictates a faster PHY rate, and transmits it to the transmission/reception apparatus. The transmission/reception apparatus changes modulation/demodulation rules based on the received SNR analytical result.

13 Claims, 19 Drawing Sheets

FOREIGN PATENT DOCUMENTS

| | | |
|---|---|---|
| EP | 1133092 | 9/2001 |
| EP | 1 178 634 | 2/2002 |
| EP | 1 398 885 | 3/2004 |
| JP | 2000-151742 | 5/2000 |
| JP | 2001-156685 | 6/2001 |
| JP | 2001-238479 | 8/2001 |
| WO | 02/095978 | 11/2002 |

OTHER PUBLICATIONS

Jose Abad et al., "Extending the Power Line LAN Up to the Neighborhood Transformer", IEEE Communications Magazine, Apr. 2003, pp. 64-70.

* cited by examiner

F I G. 4 A
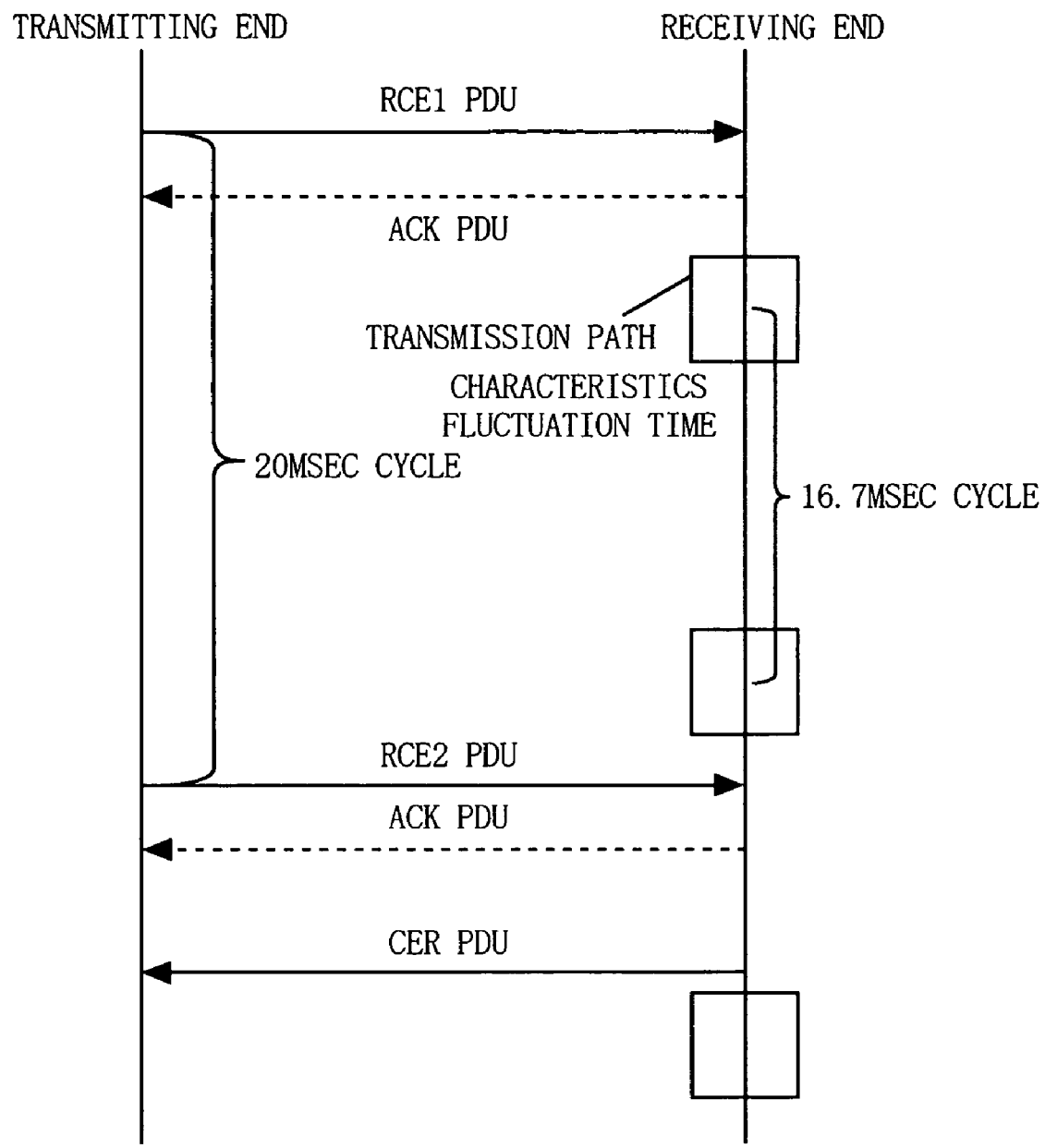

FIG. 17 PRIOR ART

| SNR | PHY RATE [Mbps] |
|---|---|
| MAXIMUM | 70 |
| MINIMUM | 40 |

COMMUNICATION NETWORK SYSTEM, AND TRANSMISSION/RECEPTION APPARATUS, METHOD AND INTEGRATED CIRCUIT FOR USE THEREIN

BACKGROUND OF THE INVENTION

1. Field of the Invention

The present invention relates to a communication network system which can perform data transmissions so as to be adaptable to changes in the state of a transmission path, as well as a transmission/reception apparatus, a method, and an integrated circuit for use therein. More particularly, the present invention relates to a communication network system which employs a power line as a transmission path, as well as a transmission/reception apparatus, a method, and an integrated circuit for use therein.

2. Description of the Background Art

As communication network systems which realize data transmissions so as to be adaptable to the changing states of a transmission path by monitoring the state of the transmission path, wireless LAN systems and power line communication systems have been put to practical use.

As a wireless LAN system, IEEE 802. 11b using 2.4 GHz, and IEEE 802.11a using 5 GHz are standardized, and are widely prevalent. The above-described wireless LAN systems employ a fall down algorithm by which an appropriate modulation method is selected from among different types of modulation methods in accordance with transmission conditions. The fall down algorithm reduces a communication speed in accordance with transmission conditions. IEEE 802.11a provides 54 Mbps transmission speed by using 64 QAM, but its communication range and noise immunity are substantially inferior to a modulation method such as 16 QAM. Thus, the wireless LAN system changes a modulation method according to transmission conditions, thereby continuing communication.

On the other hand, HomePlug1.0, which is a standard of a communication system by which 14 Mbps communication is realized by using a home power line, is developed by Home-Plug Powerline Alliance, and is in practical use (see Sobia Baiget al., "A Discrete Multitone Transceiver at the Heart of the PHY Layer of an In-Home Power Line Communication Local Area Network", IEEE Communication Magazine, April 2003, pp. 48-53).

FIG. 13 is a block diagram showing a structure of a transmission/reception apparatus 90 defined by HomePlug1.0. In FIG. 13, the transmission/reception apparatus 90 includes a transmitting-end communication control section 91, a plurality of QAM encoder sections 92, an IFFT section 93, an AFE (Analog Front End) 94, an FFT section 95, a plurality of QAM decoder sections 96, a receiving-end communication control section 97, and an SNR analytical results/acknowledgement notifying section 98.

The transmitting-end communication control section 91 determines how to allocate a bit string of input data to the QAM encoder section(s) 92 based on SNR analytical results notified by the SNR analytical results/acknowledgement notifying section 98. The transmitting-end communication control section 91 allocates a bit string of input data to each QAM encoder section 92 in accordance with an allocation scheme determined based on the SNR analytical results. That is, the transmitting-end communication control section 91 performs serial-to-parallel conversion for input data in accordance with an allocation scheme determined based on the SNR analytical results. The transmitting-end communication control section 91, which is provided with a buffer for temporarily storing input data, temporarily stores input data in the buffer. Then, the transmitting-end communication control section 91 performs serial-to-parallel conversion for the temporarily stored input data, and outputs the converted data. In the case where transmitted data is not received successfully, the transmitting-end communication control section 91 retransmits the temporarily stored input data in accordance with an acknowledgement notified by the SNR analytical results/acknowledgement notifying section 98.

A transmitting-end transmission/reception apparatus and a receiving-end transmission/reception apparatus perform a process for changing a bit allocation scheme based on the SNR analytical results in a coordinated manner. Specifically, the transmitting-end transmission/reception apparatus transmits a training packet to the receiving-end transmission/reception apparatus. In response to this, the receiving-end transmission/reception apparatus analyzes an SNR (Signal to Noise Ratio) of each carrier based on the transmitted training packet. The above-described SNR of each carrier is sent back to the transmitting-end transmission/reception apparatus as SNR analytical results. Based on the transmitted SNR analytical results, the transmitting-end transmission/reception apparatus determines a bit number allocated to each carrier. Hereinafter, the above-described process is referred to as a training session.

Each QAM encoder section 92 converts a bit string input from the transmitting-end communication control section 91 to an amplitude value and a phase value by using QAM (Quadratture Amplitude Modulation).

The IFFT section 93 executes an inverse Fourier transform based on the amplitude value and the phase value input from each QAM encoder section 92, and outputs its results. Thus, an OFDM signal modulated in accordance with the input data is output. The above-described OFDM signal is transmitted to another transmission/reception apparatus via the AFE 94.

The FFT section 95 performs a Fourier transform for the OFDM signal received from another transmission/reception apparatus via the AFE 94, and outputs an amplitude value and a phase value of each carrier.

Each QAM decoder section 96 demodulates the amplitude value and the phase value, which is output from the FFT section 95, back into a bit string by using QAM, and outputs the bit string.

The receiving-end communication control section 97 converts the bit string output from each QAM decoder section 96 to a continuous bit string, and outputs the continuous bit string as output data. That is, the receiving-end communication control section 97 performs serial-to-parallel conversion, thereby outputting output data. Also, the receiving-end communication control section 97 analyzes an SNR of each carrier based on the amplitude value and the phase value output from each QAM decoder 96 during the training session. The receiving-end communication control section 97 notifies the SNR analytical results to the transmitting-end communication control section 91 via the SNR analytical results/acknowledgement notifying section 98. The receiving-end communication control section 97 checks whether or not all packets transmitted from the transmitting-end transmission/reception apparatus are received successfully based on the generated output data. The above-described checking process is referred to an acknowledgement. The receiving-end communication control section 97 notifies acknowledgement results to the transmitting-end communication control section 91 via the SNR analytical results/acknowledgement notifying section 98.

The transmission/reception apparatus 90 shown in FIG. 13, which is compliant with HomePlug1.0, divides a data string into a large number of low rate data, and allocates the divided data to a large number of sub-carriers, each of which is orthogonal to others, for transmission. The receiving-end communication control section 97 uses a channel estimation algorithm, which is executed during a training session, for measuring an SNR in accordance with a specific frame transmitted from a transmission end. The channel estimation algorithm changes a modulation speed by estimating channel conditions. By conventional HomePlug1.0 specifications, a plurality of sub-carriers are modulated in a similar manner by selecting a single modulation parameter. However, newly performed researches have revealed that further speeding-up is realized using a method called DMT (Discrete Multitone), by which a bit number to be allocated to each carrier is determined by the transmitting-end communication control section 91 in accordance with each carrier's SNR fed back thereto.

FIGS. 14A to 14C are illustrations for describing a basic concept of DMT. In FIG. 14A, sub-carriers are denoted by numerals 1 to n, a horizontal axis indicates a frequency, and a vertical axis indicates a bit number (i.e., modulation level) allocated to each carrier. FIG. 14A shows that the sub-carriers are in the same state.

FIG. 14B is an illustration showing an exemplary SNR analyzed at the receiving end. In FIG. 14B, a horizontal axis indicates a frequency, and a vertical axis indicates an SNR value.

In the case of the SNR as shown in FIG. 14B, the transmitting-end communication control section 91 allocates a greater number of bit to a sub-carrier with a frequency of higher SNR values, and does not allocate any bit to a sub-carrier with SNR values smaller than a predetermined threshold value (SNR threshold), as shown in FIG. 14C. As such, the transmitting-end communication control section 91 controls the bit allocation scheme applied to the QAM encoder sections 92 based on the SNR analytical results, thereby changing a modulation method to transmit data without transmission errors.

The SNR is decreased by the following factors, for example: load conditions depending on a status of a device connected to a power line, noise, narrow-band noise of an amateur radio and a short-wave radio, etc., and attenuation of a signal (see Jose Abad et al., "Extending the Power Line LAN Up to the Neighborhood Transformer", IEEE Communications Magazine, April 2003, pp. 64-70). The above-described factors change in accordance with wiring conditions, and a connection status or an operation status of a device. The factors may change on a minute-by-minute, hour-by-hour, day-by-day, or year-by-year basis.

In the conventional wireless LAN system and the power line communication system, a modulation parameter is adaptively changed by the fall down algorithm, the channel estimation algorithm, or the like. As such, a transmission speed is adjusted so as to avoid errors, thereby achieving the maximum throughput under the current transmission conditions.

In the above-described systems, a training session may be performed before communication is started. During the training session, it is necessary to perform a sequence of processes such that a specific packet (a test packet) is transmitted from a transmitting end, and a feedback packet (SNR analytical results) is sent back from a receiving end. Thus, frequent training sessions increase overhead, whereby communication speed is reduced irrespective of transmission conditions. In order to avoid such reduction in communication speed, a training session may be performed at regular intervals, for example, in a cycle of five seconds. However, the channel conditions and the above-described cycle are not synchronized. As a result, if the channel conditions change during a cycle, communication is interrupted until a next cycle is started. In the case where a training session is performed in a cycle of five seconds, for example, communication may be interrupted as much as five seconds in the worst case. Thus, even when a training session is being performed at regular intervals, a cycle thereof may be changed to an irregular cycle in the case where communication conditions are degraded due to a change in channel conditions.

In either one of the above cases, a transmitting end sends a specific packet only once during a training session, and a receiving end returns a feedback packet only once, which gives rise to the following problems.

In a power line communication system, noise and impedance fluctuates in synchronization with a supply power cycle or half the supply power cycle. For example, in the case where the supply power cycle is 50 Hz, the noise and impedance will have a fluctuation cycle of 20 msec or 10 msec. In the case where the supply power cycle is 60 Hz, the noise and impedance will have a fluctuation cycle 16.7 msec or 8.3 msec.

Noise which is in synchronization with the supply power cycle or half the supply power cycle of a home appliance, and impedance fluctuations during a supply power cycle of a half- or full-wave rectifier circuit in a home appliance are causes of noise/impedance fluctuations. Noise/impedance fluctuations occur locally, in the neighborhood of the responsible home appliance or the like. In particular, it has been found that large fluctuations in noise and impedance may be ascribable to a recharger for a cellular phone, an electric carpet heater, or the like. Since these devices are in wide use at general households, it is necessary to devise countermeasures against the fluctuations in transmission path characteristics caused by such devices, in order to be able to transmit AV (Audio Visual) signals, which require low-delay and low-jitter characteristics.

FIG. 15 is a graph showing temporal changes in the phase of a signal which is transmitted over a power line to which an electric carpet heater is connected. As shown in FIG. 15, in accordance with the impedance fluctuations of the power line due to a half-wave rectifier circuit provided in the electric carpet heater, the phase of the signal being transmitted over the power line is fluctuating with a cycle of about 8 msec.

FIG. 16 is a graph showing measurement results of SNR of each carrier, obtained through channel estimation in the presence of power line impedance fluctuations as shown in FIG. 15. FIG. 16 show fluctuations in the measurement results of SNR of each carrier which are obtained through channel estimation in the presence of power line impedance fluctuations. A frame in which the SNR shows a maximum value is a frame which is transmitted at a point in time where the phase of the signal being transmitted over the power line is not fluctuating. A frame in which the SNR shows a minimum value is a frame which is transmitted at a point in time where the phase of the signal being transmitted over the power line is fluctuating. There is a maximum difference of 20 dB in the SNR of sub-carrier numbers 120 to 200 (corresponding to frequencies of 10 to 15 MHz) between the frame transmitted when the phase of the signal being transmitted over the power line is fluctuating and the frame transmitted when the phase of the signal being transmitted over the power line is not fluctuating. Thus, there can be as much as 20 dB of SNR fluctuations, depending on whether or not the point in time where a channel estimation is performed coincides with the point in time where the phase characteristics undergo a great fluctuation.

Next, the relationship between SNR evaluation results and communication rates will be discussed. FIG. 17 is a table which shows off-line simulation results of communication rates in the physical layer (hereinafter referred to as "PHY rates"), with respect to a maximum SNR and a minimum SNR, in the case where a channel to be used and a modulation level are selected based on a channel estimation.

As shown in FIG. 17, there is a difference of 30 Mbps between the PHY rate selected for the case where the SNR is maximum and the PHY rate selected for the case where the SNR is minimum. Therefore, in the conventional technique where a channel estimation is performed only once during a training session, if the transmission timing for an estimation request packet coincides with a phase-fluctuating moment, a PHY rate which is based on the minimum SNR will be selected. In this case, the communication efficiency is deteriorated because, during a period where the phase is not fluctuating, a transmission rate which is 30 Mbps slower than an actually available PHY rate is being used.

SUMMARY OF THE INVENTION

Therefore, an aspect of the present invention is to provide a communication network system which can set communication parameters which enable an operation under a maximum possible communication rate in a situation where a transmission path has cyclic and local noise and/or cyclic and local impedance fluctuations, without being influenced by such local noise/impedance fluctuations; and a transmission/reception apparatus, a method, and an integrated circuit for use therein.

The present invention has the following aspects. The present invention is directed to a transmission/reception apparatus for transmitting a signal which is modulated based on input data to another apparatus on a communication network, and receiving a signal from another apparatus on the communication network and demodulating the received signal. The transmission/reception apparatus comprises a multicarrier-modulation transmission section for modulating a plurality of carriers having respectively different frequencies based on the input data, and transmitting the modulated signal to another apparatus on the communication network; a multicarrier reception/demodulation section for receiving a multicarrier-modulated signal transmitted from another apparatus on the communication network and demodulating the multicarrier-modulated signal; and a control section for, if a predetermined activation condition is satisfied, communicating with another apparatus on the communication network acting as a counterpart of communication, executing two or more instances of a channel estimation algorithm for evaluating transmission quality on a transmission path with respect to a frequency of each carrier, and controlling, based on the transmission quality evaluated through the two or more instances of the channel estimation algorithm executed, a set of modulation/demodulation rules to be used in the multicarrier-modulation transmission section and the multicarrier reception/demodulation section, wherein a time interval between two adjacent instances of the channel estimation algorithm to be executed is unequal to a cycle of quality fluctuation on the transmission path.

Preferably, in each instance of the channel estimation algorithm, the control section derives, as an evaluation result of transmission quality on the transmission path with respect to the frequency of each carrier, a set of modulation/demodulation rules for the multicarrier-modulation transmission section and the multicarrier reception/demodulation section enabling transmission or reception of the signal without deterioration in the transmission quality. The control section calculates a communication rate in a physical layer to be obtained when using each set of modulation/demodulation rules, and selects one of the sets of modulation/demodulation rules that dictates a maximum communication rate as the set of modulation/demodulation rules to be used in the multicarrier-modulation transmission section and the multicarrier reception/demodulation section.

For example, in each instance of the channel estimation algorithm, the control section evaluates transmission quality on the transmission path by determining a signal-to-noise ratio on the transmission path with respect to the frequency of each carrier, and derives a set of modulation/demodulation rules for the multicarrier-modulation transmission section and the multicarrier reception/demodulation section by allocating, for any carrier having a signal-to-noise ratio which is equal to or greater than a predetermined threshold value, a modulation level which is in accordance with the value of the signal-to-noise ratio, and by ensuring that any carrier having a signal-to-noise ratio which is less than the predetermined threshold value is not used, based on the modulation level for each carrier. The control section calculates the communication rate to be obtained when using each set of modulation/demodulation rules, and selects one of the sets of modulation/demodulation rules that dictates a maximum communication rate as the set of modulation/demodulation rules to be used in the multicarrier-modulation transmission section and the multicarrier reception/demodulation section.

Preferably, in each instance of the channel estimation algorithm, the control section derives, as an evaluation result of transmission quality on the transmission path with respect to the frequency of each carrier, a set of modulation/demodulation rules for the multicarrier-modulation transmission section and the multicarrier reception/demodulation section enabling transmission or reception of the signal without deterioration in the transmission quality. The control section calculates a throughput to be provided for an upper layer when using each set of modulation/demodulation rules, and selects one of the sets of modulation/demodulation rules that dictates a maximum throughput as the set of modulation/demodulation rules to be used in the multicarrier-modulation transmission section and the multicarrier reception/demodulation section.

For example, in each instance of the channel estimation algorithm, the control section evaluates transmission quality on the transmission path by determining a signal-to-noise ratio on the transmission path with respect to the frequency of each carrier, and derives a set of modulation/demodulation rules for the multicarrier-modulation transmission section and the multicarrier reception/demodulation section by allocating, for any carrier having a signal-to-noise ratio which is equal to or greater than a predetermined threshold value, a modulation level which is in accordance with the value of the signal-to-noise ratio, and by ensuring that any carrier having a signal-to-noise ratio which is less than the predetermined threshold value is not used. The control section causes the multicarrier-modulation transmission section to actually transmit a signal by using each of the derived sets of modulation/demodulation rules, calculates the throughput for each set of modulation/demodulation rules based on a data retransmission rate, and selects one of the sets of modulation/demodulation rules that dictates a maximum throughput as the set of modulation/demodulation rules to be used in the multicarrier-modulation transmission section and the multicarrier reception/demodulation section.

Preferably, the control section includes: PHY rate modulation/demodulation rules determination means for deriving, in each instance of the channel estimation algorithm, as an evaluation result of transmission quality on the transmission path with respect to the frequency of each carrier, a set of modulation/demodulation rules for the multicarrier-modulation transmission section and the multicarrier reception/demodulation section enabling transmission or reception of the signal without deterioration in the transmission quality. The control section calculates a communication rate in a physical layer to be obtained when using each of the derived sets of modulation/demodulation rules, and selects one of the sets of modulation/demodulation rules that dictates a maximum communication rate as the set of modulation/demodulation rules to be used in the multicarrier-modulation transmission section and the multicarrier reception/demodulation section. The control section includes a MAC rate modulation/demodulation rules determination means for deriving, in each instance of the channel estimation algorithm, as an evaluation result of transmission quality on the transmission path with respect to the frequency of each carrier, a set of modulation/demodulation rules for the multicarrier-modulation transmission section and the multicarrier reception/demodulation section enabling transmission or reception of the signal without deterioration in the transmission quality. The control section calculates a throughput to be provided for an upper layer when using each of the derived sets of modulation/demodulation rules, and selects one of the sets of modulation/demodulation rules which dictates a maximum throughput as the set of modulation/demodulation rules to be used in the multicarrier-modulation transmission section and the multicarrier reception/demodulation section. The control section also includes a switching means for, based on a predetermined condition, switching between selecting the set of modulation/demodulation rules to be used by employing the PHY rate modulation/demodulation rules determination means or selecting the set of modulation/demodulation rules to be used by employing the MAC rate modulation/demodulation rules determination means.

Preferably, the control section retransmits data if the data is not correctly received by the other apparatus acting as the counterpart of communication.

In a preferred embodiment, the transmission path is a power line to which commercial electric power is applied, and the time interval between two adjacent instances of the channel estimation algorithm to be executed is unequal to an integer multiple of a cycle of the commercial electric power and unequal to an integer multiple of half the cycle of the commercial electric power.

Preferably, the control section further comprises transmission quality evaluation means for, in response to a channel estimation algorithm executed by the other apparatus on the communication network acting as the counterpart of communication, evaluating transmission quality on the transmission path with respect to the frequency of each carrier, and returning a result of each evaluation to the other apparatus.

Preferably, based on the evaluation of the transmission quality on the transmission path with respect to the frequency of each carrier, the transmission quality evaluation means derives a set of modulation/demodulation rules for each instance of the channel estimation algorithm, calculates a communication rate in a physical layer to be obtained when using each of the sets of modulation/demodulation rules, and returns one of the sets of modulation/demodulation rules that dictates a maximum communication rate to the other apparatus.

Preferably, based on evaluation results of transmission quality on the transmission path with respect to the frequency of each carrier which is sent from the other apparatus on the communication network acting as the counterpart of communication in response to each instance of the channel estimation algorithm, the control section derives a set of modulation/demodulation rules for each instance of the channel estimation algorithm, calculates a communication rate in a physical layer to be obtained when using each of the sets of modulation/demodulation rules, and selects one of the sets of modulation/demodulation rules that dictates a maximum communication rate as the set of modulation/demodulation rules to be used in the multicarrier-modulation transmission section and the multicarrier reception/demodulation section.

Moreover, the present invention is directed to a communication network system for allowing a signal which is modulated based on input data to be transmitted or received between first and second transmission/reception apparatus. The first transmission/reception apparatus comprising: a first multicarrier-modulation transmission section for modulating a plurality of carriers having respectively different frequencies based on the input data, and transmitting the modulated signal to the second transmission/reception apparatus; a first multicarrier reception/demodulation section for receiving and demodulating the multicarrier-modulated signal transmitted from the second transmission/reception apparatus; and a first control section for, if a predetermined activation condition is satisfied, communicating with the second transmission/reception apparatus, executing two or more instances of a channel estimation algorithm for evaluating transmission quality on a transmission path with respect to a frequency of each carrier, and controlling, based on the transmission quality evaluated through the two or more instances of the channel estimation algorithm executed, a set of modulation/demodulation rules to be used in the first multicarrier-modulation transmission section and the first multicarrier reception/demodulation section. The second transmission/reception apparatus comprising: a second multicarrier-modulation transmission section for modulating a plurality of carriers having respectively different frequencies based on the input data, and transmitting the modulated signal to the first transmission/reception apparatus; a second multicarrier reception/demodulation section for receiving and demodulating the multicarrier-modulated signal transmitted from the first transmission/reception apparatus; and a second control section for, in response to the channel estimation algorithm executed by the first transmission/reception apparatus, evaluating transmission quality on the transmission path with respect to the frequency of each carrier and returning a result of each evaluation to the first transmission/reception apparatus, wherein a time interval between two adjacent instances of the channel estimation algorithm to be executed is unequal to a cycle of quality fluctuation on the transmission path.

Moreover, the present invention is directed to a method for determining a set of modulation/demodulation rules to be used in first and second transmission/reception apparatuses for transmitting or receiving a multicarrier-modulated signal on a communication network, comprising: a step performed through a cooperation of the first transmission/reception apparatus and the second transmission/reception apparatus of, if a predetermined activation condition is satisfied, executing two or more instances of a channel estimation algorithm for evaluating transmission quality on a transmission path in the communication network with respect to a frequency of each carrier, and a step of determining, based on the transmission quality evaluated through the two or more instances of the channel estimation algorithm executed, a set of modulation/demodulation rules to be used for multicarrier modulation/demodulation, wherein a time interval between two adjacent instances of the channel estimation algorithm to be executed is unequal to a cycle of quality fluctuation on the transmission path.

Moreover, the present invention is directed to an integrated circuit to be used in a transmission/reception apparatus for transmitting a signal which is modulated based on input data to another apparatus on a communication network, and receiving a signal from another apparatus on the communication network and demodulating the received signal. The integrated circuit comprises a multicarrier-modulation transmission section for modulating a plurality of carriers having respectively different frequencies based on the input data, and transmitting the modulated signal to another apparatus on the communication network; a multicarrier reception/demodulation section for receiving a multicarrier-modulated signal transmitted from another apparatus on the communication network and demodulating the multicarrier-modulated signal; and a control section for, if a predetermined activation condition is satisfied, communicating with another apparatus on the communication network acting as a counterpart of communication, executing two or more instances of a channel estimation algorithm for evaluating transmission quality on a transmission path with respect to the frequency of each carrier, and controlling, based on the transmission quality evaluated through the two or more instances of the channel estimation algorithm executed, a set of modulation/demodulation rules to be used in the multicarrier-modulation transmission section and the multicarrier reception/demodulation section, wherein a time interval between two adjacent instances of the channel estimation algorithm to be executed is unequal to a cycle of quality fluctuation on the transmission path.

Moreover, the present invention is directed to a program for controlling a computer to determine a set of modulation/demodulation rules to be used in first and second transmission/reception apparatuses for transmitting or receiving a multicarrier-modulated signal on a communication network, comprising: a step performed through a cooperation of the first transmission/reception apparatus and the second transmission/reception apparatus of, if a predetermined activation condition is satisfied, executing two or more instances of a channel estimation algorithm for evaluating transmission quality on a transmission path in the communication network with respect to a frequency of each carrier, and a step of determining, based on the transmission quality evaluated through the two or more instances of the channel estimation algorithm executed, a set of modulation/demodulation rules to be used for multicarrier modulation/demodulation, wherein a time interval between two adjacent instances of the channel estimation algorithm to be executed is unequal to a cycle of quality fluctuation on the transmission path.

According to the present invention, two or more instances of a channel estimation algorithm are executed, such that a time interval between adjacent instances of the channel estimation algorithm to be executed is unequal to a cycle of quality fluctuations on a transmission path. Therefore, modulation rules which are based on the transmission quality as evaluated by one of the instances of the channel estimation algorithm can provide a maximum possible communication rate or throughput even in the presence of cyclic and local noise or cyclic and local impedance fluctuations.

By determining the modulation rules so that the communication rate in the physical layer (PHY rate) is maximized, it becomes possible to obtain a maximum communication rate even in the presence of cyclic and local noise or cyclic and local impedance fluctuations.

By determining the modulation rules so that a throughput (MAC rate) to be provided for an upper layer is maximized, it becomes possible to transfer data with minimum errors, thus improving the communication efficiency.

By switching between modulation rules which dictate a maximum PHY rate and modulation rules which dictate a maximum MAC rate as necessary, it becomes possible to, for example, employ modulation rules which dictate a maximum PHY rate at usual times, and switch to modulation rules which dictate a maximum MAC rate in the case where the transmission path characteristics have deteriorated and a high retransmission rate exists. Thus, the modulation rules can be flexibly changed.

By providing a data retransmission function, it becomes possible to overcome transmission errors which occur due to the used carriers and modulation parameters not being suited to cyclic noise or impedance fluctuations.

In the case where a power line to which commercial electric power is applied is used as the transmission path, by ensuring that a time interval between two adjacent instances of the channel estimation algorithm to be executed is not equal to an integer multiple of the cycle of the commercial electric power or half the cycle of the commercial electric power, it becomes possible to provide a maximum possible communication rate or throughput even in the presence of noise/impedance fluctuations which cyclically occur in accordance with the supply power cycle.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4A is a sequence diagram illustrating a flow of processes between a transmission/reception apparatus which transmits training packets and a transmission/reception apparatus which receives the training packets during a training session;

FIG. 17 is a table which shows off-line simulation results of communication rates in the physical layer (PHY rates), with respect to a maximum SNR and a minimum SNR, in the case where a channel to be used and a modulation level are selected based on a channel estimation.

DETAILED DESCRIPTION OF THE INVENTION

Hereinafter, embodiments of the present invention will be described with reference to the accompanying figures.

First Embodiment

Figure 1:
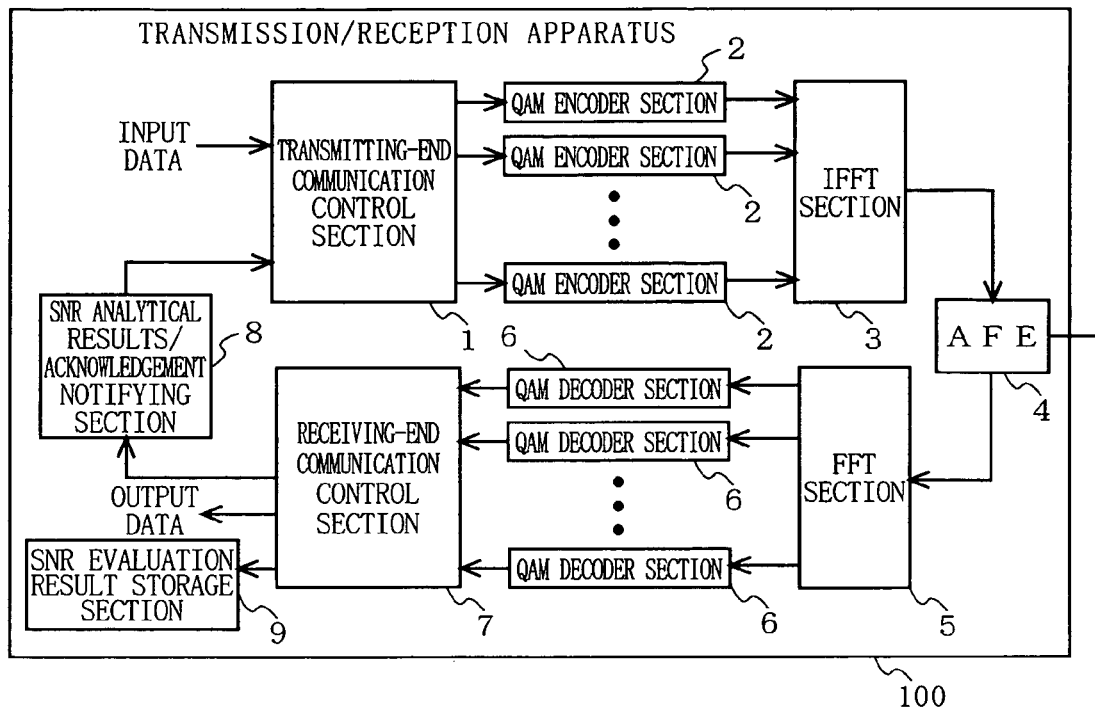
FIG. 1 is a block diagram illustrating the structure of a communication network system according to a first embodiment of the present invention, and the structure of transmission/reception apparatuses used in the communication network system.
Figure 1:
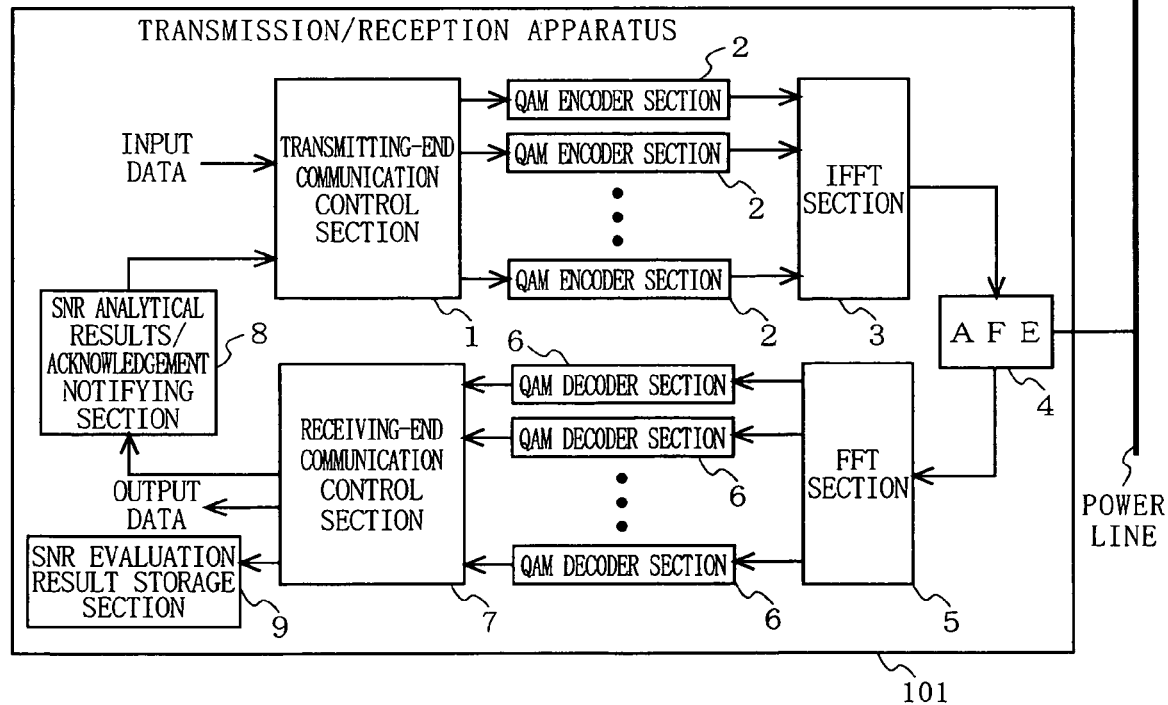

FIG. 1 is a block diagram illustrating the structure of a communication network system according to a first embodiment of the present invention, and the structure of transmission/reception apparatuses used in the communication network system. In FIG. 1, the communication network system comprises transmission/reception apparatuses 100 and 101, which are connected to each other via a power line to which commercial electric power is supplied. Although FIG. 1 illustrates an example where there are two transmission/reception apparatuses, it will be appreciated that three or more transmission/reception apparatuses may be employed.

The transmitting-end transmission/reception apparatus 100, which transmits packets based on input data, transmits training packets for checking the state of the power line at two distinct points in time during a training session. Every time a training packet is transmitted, the receiving-end transmission/reception apparatus 101 to which the training packet is transmitted analyzes SNR, which represents a transmission quality on the power line with respect to the frequency of each carrier, and stores the result of the analysis as an SNR evaluation result. In the first embodiment, during a training session, training packets are transmitted at two points in time; therefore, the receiving-end transmission/reception apparatus 101 obtains two SNR evaluation results. Hereinafter, the portion of a training session which is associated with the transmission of one training packet and obtainment of one SNR evaluation result will be referred to as a "channel estimation algorithm". The channel estimation algorithm is a process for evaluating the transmission quality on the power line with respect to each carrier frequency. The receiving-end transmission/reception apparatus 101 compares two SNR evaluation results which are obtained from two instances of the aforementioned channel estimation algorithm, selects one of the SNR evaluation results that dictates a greater (i.e., faster) total of modulation speeds of the carriers (PHY rate), and transmits the selected one of the SNR evaluation results (hereinafter referred to as an "SNR analytical result") back to the transmitting-end transmission/reception apparatus 100. The SNR analytical result contains a tone map which describes carriers to be used so that signals can be transmitted and received without causing degradation in transmission quality, and modulation levels for such carriers to be used. Based on the received SNR analytical result, the transmitting-end transmission/reception apparatus 100 changes the modulation method.

In FIG. 1, the transmission/reception apparatuses 100 and 101 each include a transmitting-end communication control section 1, a plurality of QAM encoder sections 2, an IFFT section 3, an AFE 4, an FFT section 5, a plurality of QAM decoder sections 6, a receiving-end communication control section 7, an SNR analytical results/acknowledgement notifying section 8, and an SNR evaluation result storage section 9.

The plurality of QAM encoder sections 2 and the IFFT section 3 function as a multicarrier-modulation transmission section for modulating a plurality of carriers having respectively different frequencies based on input data, and transmitting, via the AFE 4, the modulated signal to another transmission/reception apparatus (100 or 101) which is connected to the power line.

The FFT section 5, and the QAM decoder sections 6 function as a multicarrier reception/demodulation section for receiving and demodulating a multicarrier-modulated signal which is sent from another transmission/reception apparatus (100 or 101) via the power line and the AFE 4.

The transmitting-end communication control section 1, the receiving-end communication control section 7, the SNR analytical results/acknowledgement notifying section 8, and the SNR evaluation result storage section 9 are control sections for controlling modulation rules to be used in the multicarrier-modulation transmission section and demodulation rules to be used in the multicarrier reception/demodulation section. The modulation rules and the demodulation rules will be collectively referred to as "modulation/demodulation rules". The modulation/demodulation rules define which carriers are to be used, which carriers are not to be used, modulation levels for used carriers, and the like.

Figure 14A:
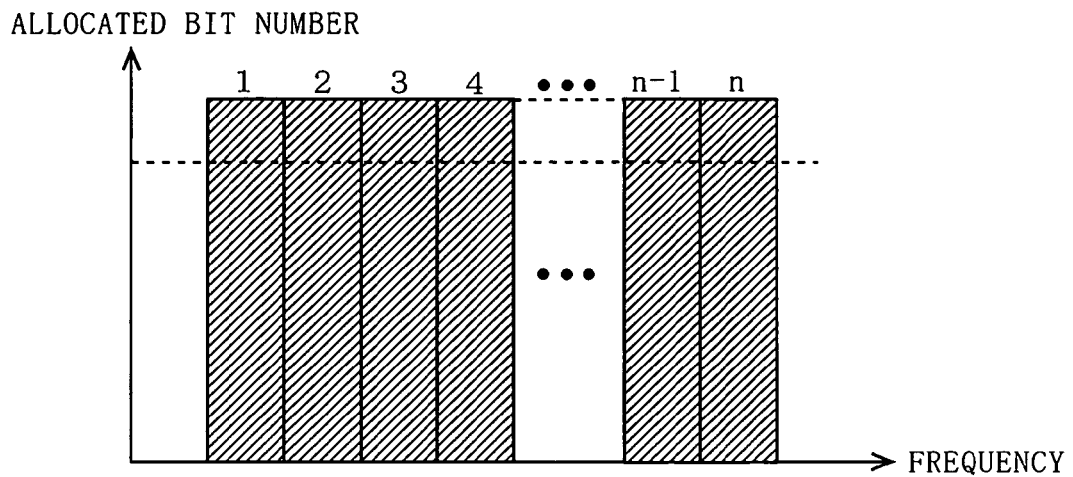
FIG. 14A is an illustration for describing a basic concept of DMT.
Figure 14B:
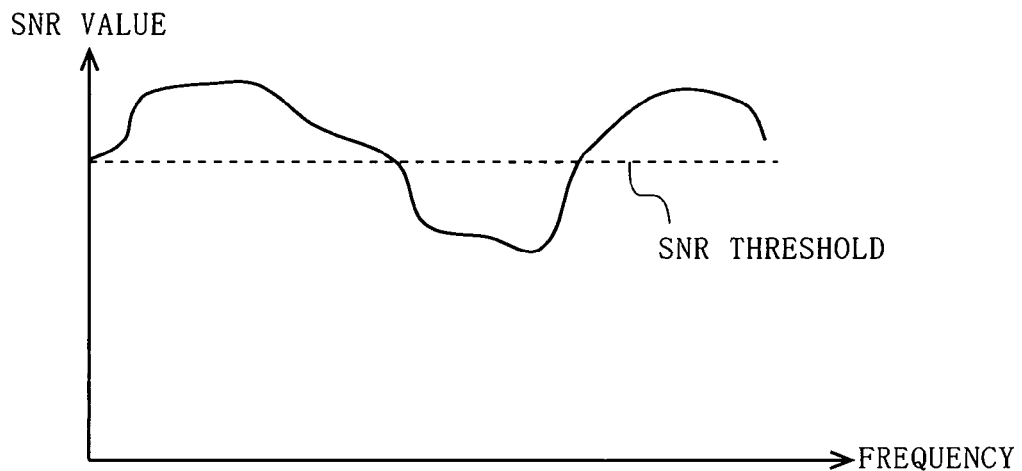
FIG. 14B is an illustration for describing a basic concept of DMT.
Figure 14C:
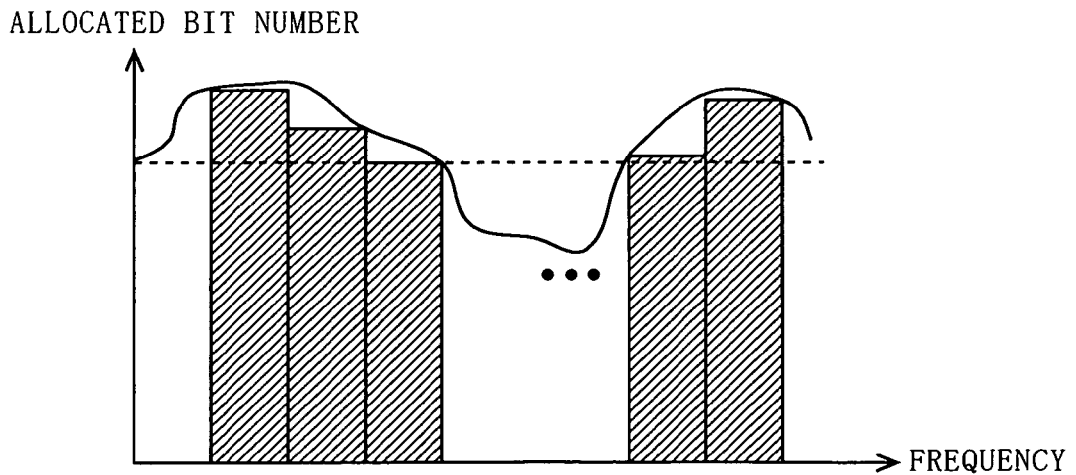
FIG. 14C is an illustration for describing a basic concept of DMT.
Figure 15:
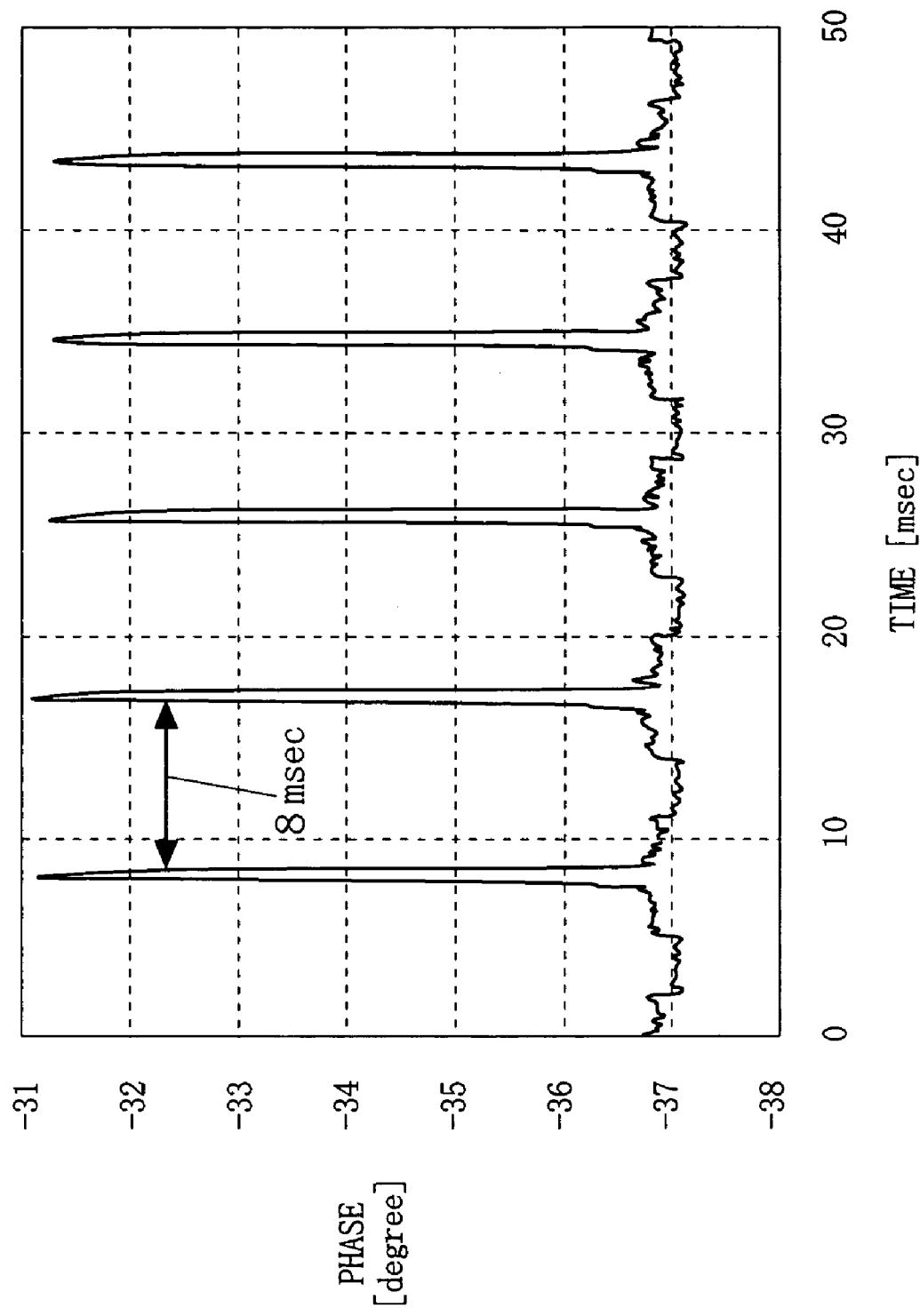
FIG. 15 is a graph showing temporal changes in the phase of a signal which is transmitted over a power line to which an electric carpet heater is connected.
Figure 16:
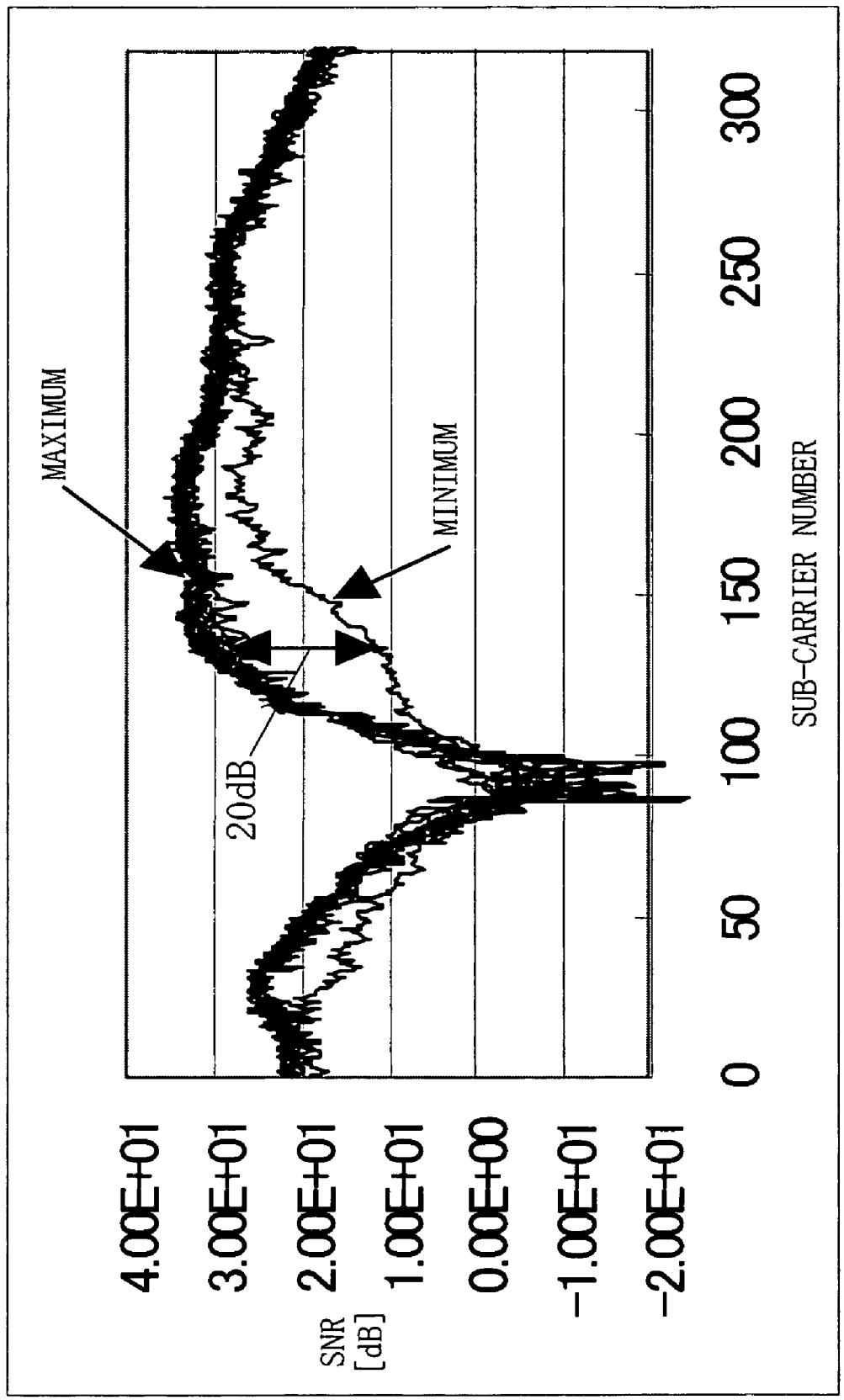
FIG. 16 is a graph showing measurement results of SNR of each carrier, obtained through channel estimation in the presence of power line impedance fluctuations as shown in FIG. 15.

Hereinafter, the functions of the respective functional blocks will be described with respect to the case where the transmitting-end transmission/reception apparatus 100 transmits data to the receiving-end transmission/reception apparatus 101. Based on an SNR analytical result notified from the SNR analytical results/acknowledgement notifying section 8, the transmitting-end communication control section 1 of the transmission/reception apparatus 100 determines how to allocate a bit string of input data to the QAM encoder sections 2, and determines modulation parameters, e.g., modulation levels, in the QAM encoder sections 2 to be used. Note that the input data as used herein is continuous data. Specifically, as shown in FIG. 14C, for any carrier whose SNR is equal to or greater than a predetermined threshold value (SNR threshold), the transmitting-end communication control section 1 of the transmission/reception apparatus 100 assigns a modulation level, which is in accordance with the SNR value, to a QAM encoder section 2. On the other hand, for any carrier whose SNR is less than the predetermined threshold value, the transmitting-end communication control section 1 controls a QAM encoder section 2 so as not to use the carrier.

In accordance with an allocation scheme which is determined based on the SNR analytical result, the transmitting-end communication control section 1 of the transmission/reception apparatus 100 allocates the bit string of input data to the QAM encoder sections 2. In other words, the transmitting-end communication control section 1 subjects the input data to serial-to-parallel conversion in accordance with an allocation scheme which is determined based on a tone map contained in the SNR analytical result. The transmitting-end communication control section 1 of the transmission/reception apparatus 100 controls the QAM encoder sections 2 in accordance with modulation parameters which are determined based on the tone map contained in the SNR analytical result. The allocation scheme and the modulation parameters are the modulation rules.

The transmitting-end communication control section 1 of the transmission/reception apparatus 100 includes a buffer for temporarily storing input data, and uses this buffer to temporarily store input data. The transmitting-end communication control section 1 subjects the temporarily stored input data to serial-to-parallel conversion, and outputs the converted data. Based on an acknowledgement which is to be notified from the SNR analytical results/acknowledgement notifying section 8, the transmitting-end communication control section 1 of the transmission/reception apparatus 100 determines whether the transmitted packet has been correctly received. If the packet has not been correctly received, the transmitting-end communication control section 1 of the transmission/reception apparatus 100 retransmits the temporarily stored input data.

During a training session, the transmitting-end communication control section 1 of the transmission/reception apparatus 100 executes the channel estimation algorithm at two distinct points in time, and outputs training packets at two points in time. Note that the training session is to be begun when it is found that acknowledgements for packets are no longer being received due to a deteriorated communication state, or when a predetermined activation condition (e.g., a predetermined period has elapsed) is satisfied. The transmitting-end communication control section 1 of the transmission/reception apparatus 100 subjects each training packet to serial-to-parallel conversion, and allocates the results of the conversion to the QAM encoder sections 2. In the training session, the transmitting-end communication control section 1 of the transmission/reception apparatus 100 equally allocates the training packets having been obtained through the serial-to-parallel conversion to the QAM encoder sections 2. It is ensured that the time interval between two points of training packet transmission is asynchronous to the cycle and asynchronous to half the cycle of the commercial electric power. In other words, the time interval between two points of training packet transmission is neither an integer multiple of the cycle of the commercial electric power, nor an integer multiple of half the cycle of the commercial electric power.

Stated otherwise, the time interval between two adjacent instances of the channel estimation algorithm to be executed is unequal to the cycle of the quality fluctuations on the power line, and is equal neither to an integer multiple of the cycle of the commercial electric power, nor to an integer multiple of half the cycle of the commercial electric power.

In accordance with the modulation rules which are designated by the transmitting-end communication control section 1, each QAM encoder section 2 of the transmission/reception apparatus 100 or 101 converts the bit string which is input from the transmitting-end communication control section 1 to an amplitude value and a phase value for output, by using a QAM technique.

The IFFT section 3 of the transmission/reception apparatus 100 or 101 performs an inverse Fourier transform based on the amplitude value and phase value input from each QAM encoder section 2, and outputs a result thereof. Thus, an OFDM signal which has been multicarrier-modulated in accordance with the input data is output. The OFDM signal is transmitted from the AFE 4 to the transmission/reception apparatus 101, via the power line.

The FFT section 5 of the transmission/reception apparatus 100 or 101 applies a Fourier transform to the OFDM signal received via the AFE 4 from the transmission/reception apparatus 101, and outputs the amplitude value and the phase value of each carrier.

In accordance with the demodulation rules designated by the receiving-end communication control section 7, each QAM decoder section 6 of the transmission/reception apparatus 100 or 101 demodulates the amplitude value and the phase value output from the FFT section 5 using a QAM technique, and outputs the result as a bit string.

In accordance with the demodulation rules which are based on the SNR analytical result, the receiving-end communication control section 7 of the transmission/reception apparatus 100 or 101 controls the demodulation levels in the QAM decoder sections 6 to be used. The receiving-end communication control section 7 of the transmission/reception apparatus 100 or 101 converts the bit strings output from the QAM decoder sections 6 into a continuous bit string, which is output as output data. Specifically, as shown in FIG. 14C, for any carrier whose SNR is equal to or greater than a predetermined threshold value (SNR threshold), the receiving-end communication control section 7 of the transmission/reception apparatus 100 or 101 assigns a demodulation level which is in accordance with the SNR value to a QAM decoder section 6. On the other hand, for any carrier whose SNR is less than the predetermined threshold value, the receiving-end communication control section 7 controls a QAM decoder section 6 so as not to use the carrier.

The receiving-end communication control section 7 of the transmission/reception apparatus 101 determines whether the output data has been correctly received or not, and if the output data has been correctly received, passes an acknowledgement to the SNR analytical results/acknowledgement notifying section 8. In response, the transmitting-end communication control section 1 of the transmission/reception apparatus 101 returns the acknowledgement which is notified from the SNR analytical results/acknowledgement notifying section 8 to the transmission/reception apparatus from which data has been transmitted.

During the training session, with respect to the training packet which is transmitted from the counterparting transmission/reception apparatus 100, the receiving-end communication control section 7 of the transmission/reception apparatus 101 analyzes SNR of the carriers based on the amplitude value and phase value output from each QAM decoder section 6, and stores SNR evaluation results to the SNR evaluation result storage section 9. Since two instances of the channel estimation algorithm are executed and training packets are transmitted at two points in time during the training session, the receiving-end communication control section 7 of the transmission/reception apparatus 101 stores two SNR evaluation results to the SNR evaluation result storage section 9. The receiving-end communication control section 7 of the transmission/reception apparatus 101 compares the two SNR evaluation results stored in the SNR evaluation result storage section 9, selects one of the SNR evaluation results that dictates a greater (i.e., faster) total of modulation speeds of the carriers, and passes the selected one of the SNR evaluation results (as an "SNR analytical result") to the SNR analytical results/acknowledgement notifying section 8.

In response, the transmitting-end communication control section 1 of the transmission/reception apparatus 101 returns the SNR analytical result which is notified from the SNR analytical results/acknowledgement notifying section 8 to the transmission/reception apparatus 100 from which the training packet has been transmitted. In the calculation of the total of modulation speeds of the carriers based on the SNR evaluation results, the receiving-end communication control section 7 of the transmission/reception apparatus 101 firstly ascertains SNR for each channel from each SNR evaluation result, and determines a tone map describing the carriers to be used and modulation methods for the carriers to be used. Next, based on the carriers to be used and the modulation methods for the carriers to be used as described in the tone map thus determined, the receiving-end communication control section 7 of the transmission/reception apparatus 101 determines a modulation speed for each carrier, and calculates the total of modulation speeds of the carriers. The total of modulation speeds of the carriers is the PHY rate when a modulation is performed by using the tone map. Then, the receiving-end communication control section 7 of the transmission/reception apparatus 101 selects one of the SNR evaluation results which is associated with a greater (i.e., faster) total of modulation speeds of the carriers (PHY rate), and transmits the tone map corresponding to the selected SNR evaluation result to the transmitting-end transmission/reception apparatus 100 as an SNR analytical result.

The SNR analytical results/acknowledgement notifying section 8 of the transmission/reception apparatus 101 passes the SNR analytical result and the acknowledgement obtained from the receiving-end communication control section 7 to the transmitting-end communication control section 1. Note that the "SNR analytical result" as used herein includes an SNR analytical result which is generated within the transmission/reception apparatus itself, as well as an SNR analytical result which has been sent from another transmission/reception apparatus. Also note that the "acknowledgement" as used herein includes an acknowledgement which is generated within the transmission/reception apparatus itself, as well as an acknowledgement which has been sent from another transmission/reception apparatus. The transmitting-end communication control section 1 of the transmission/reception apparatus 100 changes bit allocation to the QAM encoder sections 2 based on the SNR analytical result which has been sent from another transmission/reception apparatus. The receiving-end communication control section 7 of the transmission/reception apparatus 100 changes the demodulation scheme in the QAM decoder sections 6 based on the SNR analytical result which has been sent from another transmission/reception apparatus. The transmitting-end communication control section 1 of the transmission/reception apparatus 101 sends the SNR analytical result which has been generated in the transmission/reception apparatus 101 itself to another transmission/reception apparatus. The transmitting-end communication control section 1 of the transmission/reception apparatus 100 retransmits the input data based on the acknowledgement which has been sent from another transmission/reception apparatus. The transmitting-end communication control section 1 of the transmission/reception apparatus 101 sends the acknowledgement which has been generated in the transmission/reception apparatus 101 itself to another transmission/reception apparatus.

Figure 2:
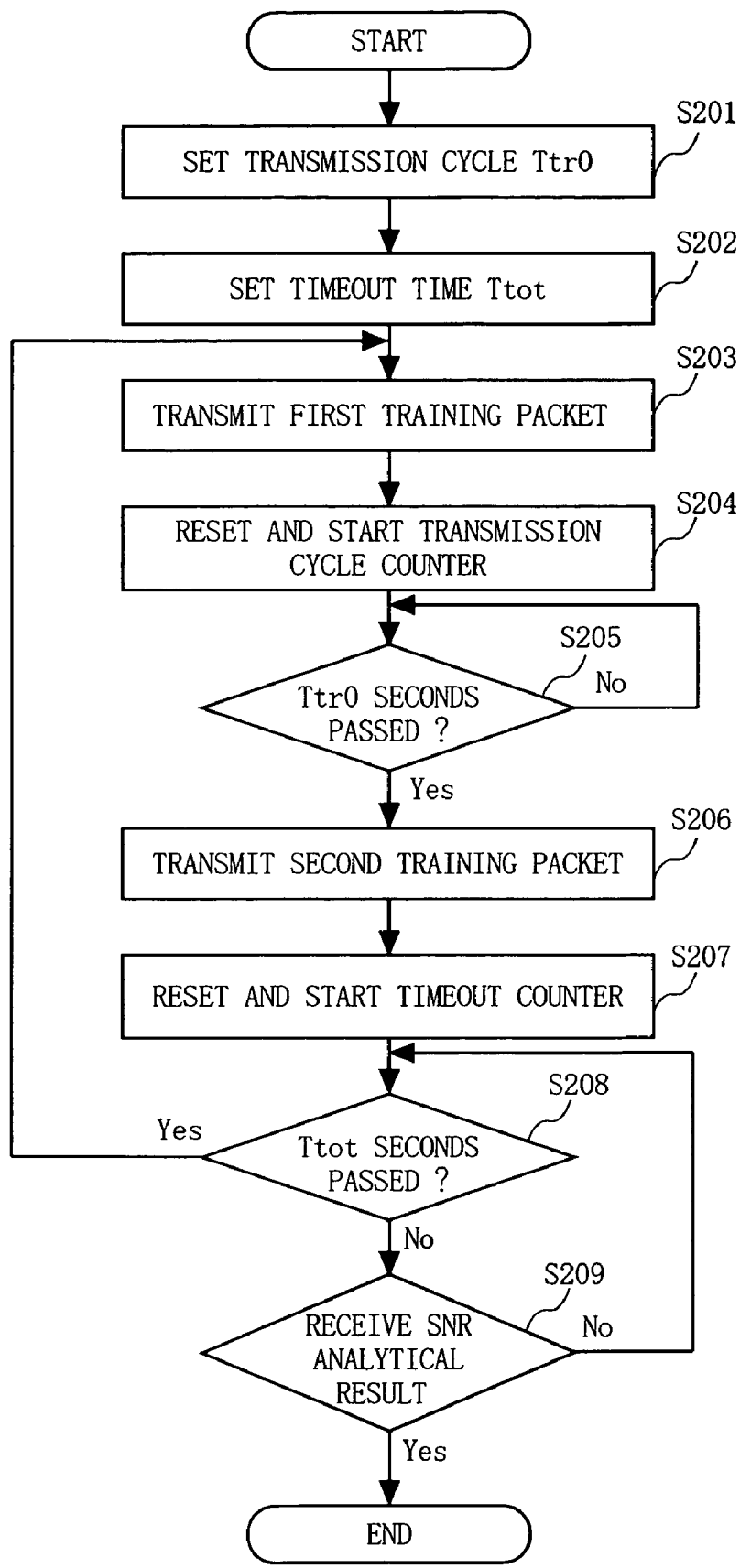
FIG. 2 is a flowchart illustrating an operation of a transmission/reception apparatus which transmits training packets during a training session.

FIG. 2 is a flowchart illustrating an operation of a transmission/reception apparatus which transmits training packets during a training session. Hereinafter, with reference to FIG. 2, an operation of the transmission/reception apparatus which transmits training packets during a training session will be described.

First, the transmitting-end communication control section 1 of the transmitting-end transmission/reception apparatus (e.g., the transmission/reception apparatus 100 shown in FIG. 1) sets a transmission cycle Ttr0 [seconds] as a time interval between a first training packet to be transmitted and a second training packet to be transmitted (step S201). The transmission cycle Ttr0 [seconds] is neither an integer multiple of the cycle of the commercial electric power nor an integer multiple of half the cycle of the commercial electric power.

Next, the transmitting-end communication control section 1 sets a timeout time Ttot [seconds] (step S202). The timeout time Ttot [seconds] may be, for example, on the order of several hundred msec. Typically, the timeout time Ttot [seconds] is longer than the transmission cycle Ttr0 [seconds]. The timeout time defines a timing with which the transmitting-end transmission/reception apparatus retransmits a training packet if an SNR analytical result is not received within a predetermined period of time.

Next, the transmitting-end communication control section 1 transmits a first training packet (step S203). The first training packet has identification information added thereto, which can be used at a receiving end to confirm that it is a first training packet.

Next, the transmitting-end communication control section 1 resets and starts a transmission cycle counter for measuring time to determine whether a transmission cycle for the training packet has been reached or not (step S204).

Next, by referring to the transmission cycle counter, the transmitting-end communication control section 1 determines whether the transmission cycle Ttr0 [seconds] has passed (step S205). Until the transmission cycle Ttr0 [seconds] passes, the transmitting-end communication control section 1 repeats the process of step S205. If the transmission cycle Ttr0 [seconds] has passed, the transmitting-end communication control section 1 proceeds to the process of step S206.

At step S206, the transmitting-end communication control section 1 transmits a second training packet. The second training packet has identification information added thereto, which can be used at a receiving end to confirm that it is a second training packet.

Next, the transmitting-end communication control section 1 resets and starts a timeout counter for measuring time to determine whether the timeout time has passed or not (step S207).

Next, by referring to the timeout counter, the transmitting-end communication control section 1 determines whether the timeout time Ttot [seconds] has passed or not (step S208). If the timeout time Ttot [seconds] has passed, the transmitting-end communication control section 1 returns to the processes of step S203 and the subsequent steps, and retransmits the first and second training packets. On the other hand, if the timeout time Ttot [seconds] has not passed yet, the transmitting-end communication control section 1 proceeds to the process of step S209.

At step S209, the transmitting-end communication control section 1 determines whether the receiving-end communication control section 7 has received an SNR analytical result from the counterparting transmission/reception apparatus and whether the received SNR analytical result has been notified to the SNR analytical results/acknowledgement notifying section 8. If an SNR analytical result has not been notified, the transmitting-end communication control section 1 returns to the process of step S208. On the other hand, if an SNR analytical result has been notified, the transmitting-end communication control section 1 ends the process. Thereafter, based on the received SNR analytical result, the transmitting-end communication control section 1 allocates input data to the QAM encoder sections 2, and transmits packets.

Figure 3:
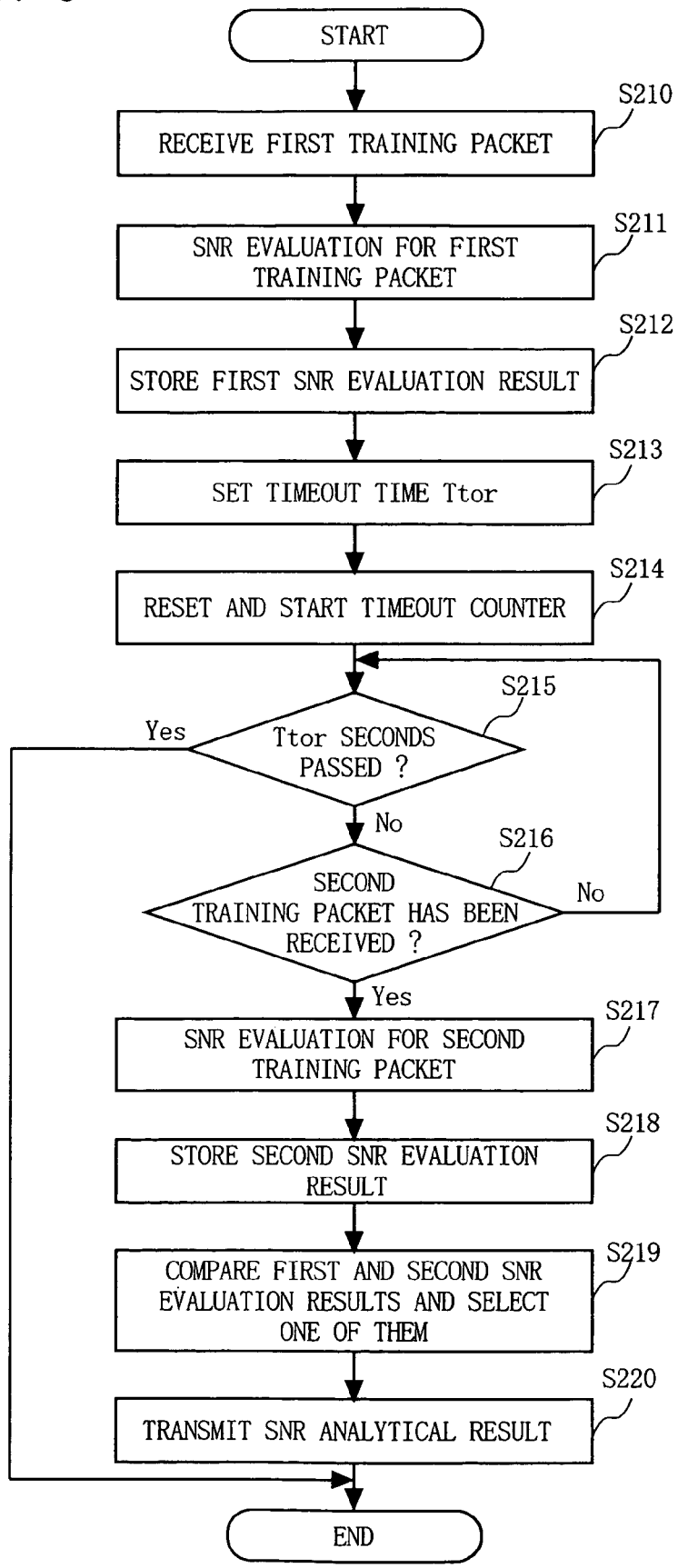
FIG. 3 is a flowchart illustrating an operation of a transmission/reception apparatus which receives training packets during a training session.

FIG. 3 is a flowchart illustrating an operation of a transmission/reception apparatus which receives training packets during a training session. Hereinafter, with reference to FIG. 3, an operation of the transmission/reception apparatus which receives training packets during a training session will be described.

Firstly, upon receiving the first training packet (step S210), the receiving-end communication control section 7 of the receiving-end transmission/reception apparatus begins the following operation. The receiving-end communication control section 7 determines, based on the identification information added to the first training packet, whether the transmitted packet is the first training packet or not.

At step S211, the receiving-end communication control section 7 evaluates the SNR of the first training packet for each carrier.

Next, the receiving-end communication control section 7 stores the evaluation result to the SNR evaluation result storage section 9 as a first SNR evaluation result (step S212). The first SNR evaluation result represents the carrier-to-carrier SNR of the first training packet.

Next, the receiving-end communication control section 7 sets a timeout time Ttor [seconds] (step S213). The timeout time Ttor [seconds] may be, for example, on the order of several hundred msec. The reason for setting the timeout time Ttor [seconds] is in order to ensure that, in a situation where the second training packet transmitted from the transmitting end cannot be received for some reason, the receiving end transitions from a state of waiting for the second training packet to a normal state where the receiving end transitions is able to receive the first training packet to be again transmitted from the transmitting end.

Next, the receiving-end communication control section 7 resets and starts a timeout counter for measuring time to determine whether the timeout time has passed or not (step S214).

Next, by referring to the timeout counter, the receiving-end communication control section 7 determines whether the timeout time Ttor [seconds] has passed or not (step S215). If the timeout time Ttor [seconds] has passed, the receiving-end communication control section 7 ends the process. On the other hand, if the timeout time Ttor [seconds] has not passed yet, the receiving-end communication control section 7 proceeds to the process of step S216.

At step S216, the receiving-end communication control section 7 determines whether the second training packet is being received. Note that the receiving-end communication control section 7 determines whether the transmitted packet is the second training packet based on the identification information added to the second training packet. If the second training packet has not been received, the receiving-end communication control section 7 returns to the process of step S215. On the other hand, if the second training packet is being received, the receiving-end communication control section 7 proceeds to the process of step S217.

At step S217, the receiving-end communication control section 7 evaluates the SNR of the second training packet for each carrier.

Next, the receiving-end communication control section 7 stores the evaluation result to the SNR evaluation result storage section 9 as a second SNR evaluation result (step S218). The second SNR evaluation result represents the carrier-to-carrier SNR of the second training packet.

Next, the receiving-end communication control section 7 determines a first tone map based on the first SNR evaluation result stored in the SNR evaluation result storage section 9, and determines a second tone map based on the second SNR evaluation result. The receiving-end communication control section 7 compares the first and second tone maps and selects an SNR evaluation result which dictates a greater (i.e., faster) total of modulation speeds of the carriers (PHY rate)(step S219).

Next, the receiving-end communication control section 7 notifies the tone map corresponding to the SNR evaluation result selected at step S219 to the SNR analytical results/acknowledgement notifying section 8, as an SNR analytical result. In response, the transmitting-end communication control section 1 transmits the SNR analytical result to the transmission/reception apparatus from which the training packet has been transmitted (step S220), and ends the process. Based on the SNR analytical result thus sent, the transmission/reception apparatus which has transmitted the training packet allocates input data to the QAM encoder sections 2, and transmits the resultant packets.

In the processes shown in FIG. 2 and FIG. 3, steps S203 to S205 and steps S210 to S215 are the first instance of the channel estimation algorithm. Steps S206 to S209 and steps S216 to S220 are the second instance of the channel estimation algorithm.

Figure 4B:
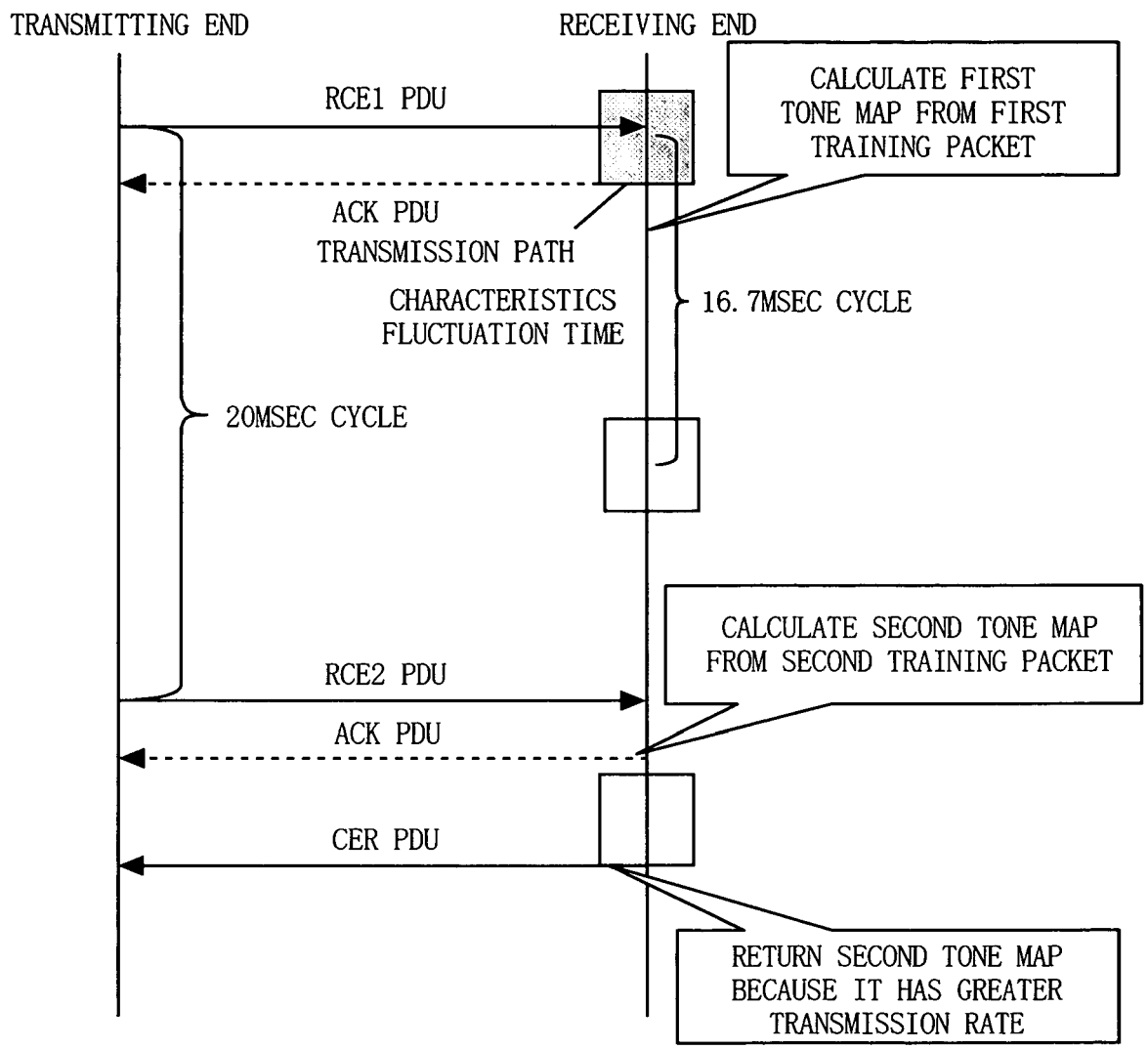
FIG. 4B is a sequence diagram illustrating a flow of processes between a transmission/reception apparatus which transmits training packets and a transmission/reception apparatus which receives the training packets during a training session.
Figure 4C:
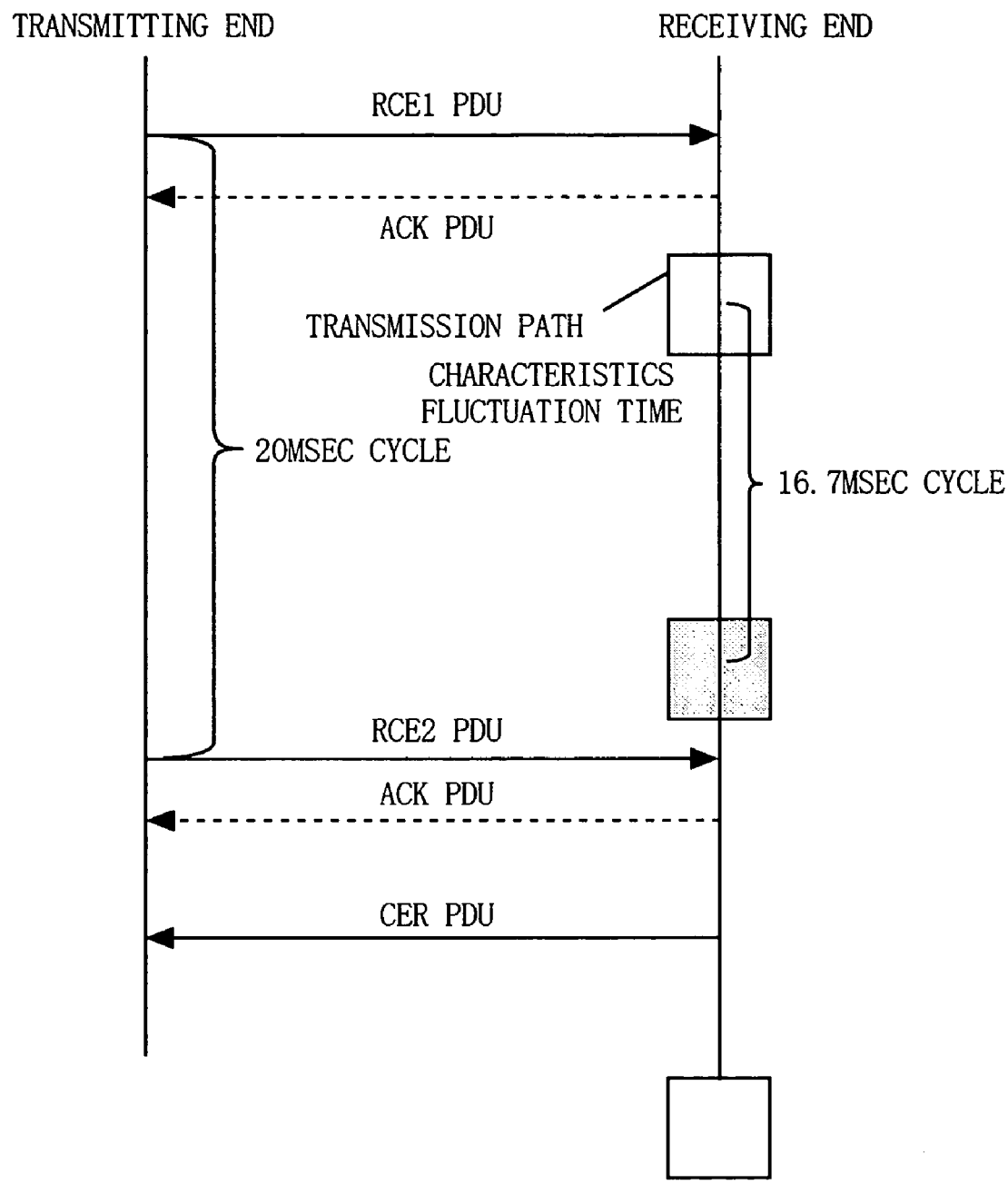
FIG. 4C is a sequence diagram illustrating a flow of processes between a transmission/reception apparatus which transmits training packets and a transmission/reception apparatus which receives the training packets during a training session.

FIGS. 4A, 4B, and 4C are sequence diagrams illustrating flows of processes between a transmission/reception apparatus which transmits training packets and a transmission/reception apparatus which receives the training packets during a training session. In FIG. 4A to 4C, each square box on a line indicating a flow of processes at the receiving end represents a period during which the characteristics of the transmission path fluctuates (hereinafter referred to as "transmission path characteristics fluctuation time"). In the illustrated example, it is assumed that each transmission path characteristics fluctuation time is reached with an interval of 16.7 msec. RCE1PDU is a first channel estimation request packet containing a first training packet. ACKPDU is a packet indicating that a channel estimation request packet has been properly received. RCE2PDU is a second channel estimation request packet containing a second training packet. The transmission cycle Ttr0 between the first channel estimation request packet and the second channel estimation request packet is 20 msec. CERPDU is a channel estimation reply packet containing the SNR analytical result. FIG. 4A illustrates a flow of processes to be performed in the case where the state of the transmission path fluctuates at neither the point of transmitting the first training packet nor the point of transmitting the second training packet. FIG. 4B illustrates a flow of processes to be performed in the case where the state of the transmission path fluctuates at the point of transmitting the first training packet. FIG. 4C illustrates a flow of processes to be performed in the case where the state of the transmission path fluctuates at the point of transmitting the second training packet.

By using the first and second training packets contained in the first and second channel estimation request packets, the receiving-end transmission/reception apparatus evaluates the carrier-to-carrier SNR each time, and based on the first and second SNR evaluation results, determines the first and second tone maps describing carriers to be used and modulation methods for the carriers to be used, etc.

As the SNR analytical result, the receiving-end transmission/reception apparatus selects the tone map which dictates the greater PHY rate among the PHY rates obtained by performing modulation by using the first and second tone maps determined in response to the two channel estimation requests, and returns a channel estimation reply packet containing the SNR analytical result to the transmitting-end transmission/reception apparatus.

The transmission cycle Ttr0 between the first channel estimation request packet and the second channel estimation request packet must be set so as to be asynchronous to the cycle of the commercial electric power and asynchronous to half the cycle of the commercial electric power. In other words, the transmission cycle Ttr0 is neither an integer multiple of the cycle of the commercial electric power nor an integer multiple of half the cycle of the commercial electric power.

Thus, by ensuring that the transmission cycle Ttr0 is asynchronous to the supply power cycle and asynchronous to half the supply power cycle, the tone maps obtained from both of RCE1PDU and RCE2PDU will dictate fast PHY rates in an exemplary case (as shown in FIG. 4A) where two transmission path characteristics fluctuation times are reached between the transmission of RCE1PDU and the transmission of RCE2PDU.

In an exemplary case (as shown in FIG. 4B) where the transmission path characteristics fluctuation time coincides with the transmission of RCE1PDU, the tone map obtained from RCE2PDU will dictate a faster PHY rate.

In an exemplary case (as shown in FIG. 4C) where the transmission path characteristics fluctuation time coincides with the transmission of RCE2PDU, the tone map obtained from RCE1PDU will dictate a faster PHY rate.

Thus, among the two channel estimation requests, it is possible to utilize the tone map which dictates a faster PHY rate. In other words, an SNR analytical result obtained at a point in time which is not encountered by a transmission path characteristics fluctuation is returned to the transmitting end as a channel estimation reply packet. Therefore, it is possible to perform communications at a transmission rate corresponding to the transmission path characteristics which exist at normal times.

Thus, according to the first embodiment of the present invention, even in the presence of cyclic and local noise, or cyclic and local impedance fluctuations, a decrease in the communication rate due to the use of modulation parameters associated with a low modulation speed can be prevented.

Figure 5:
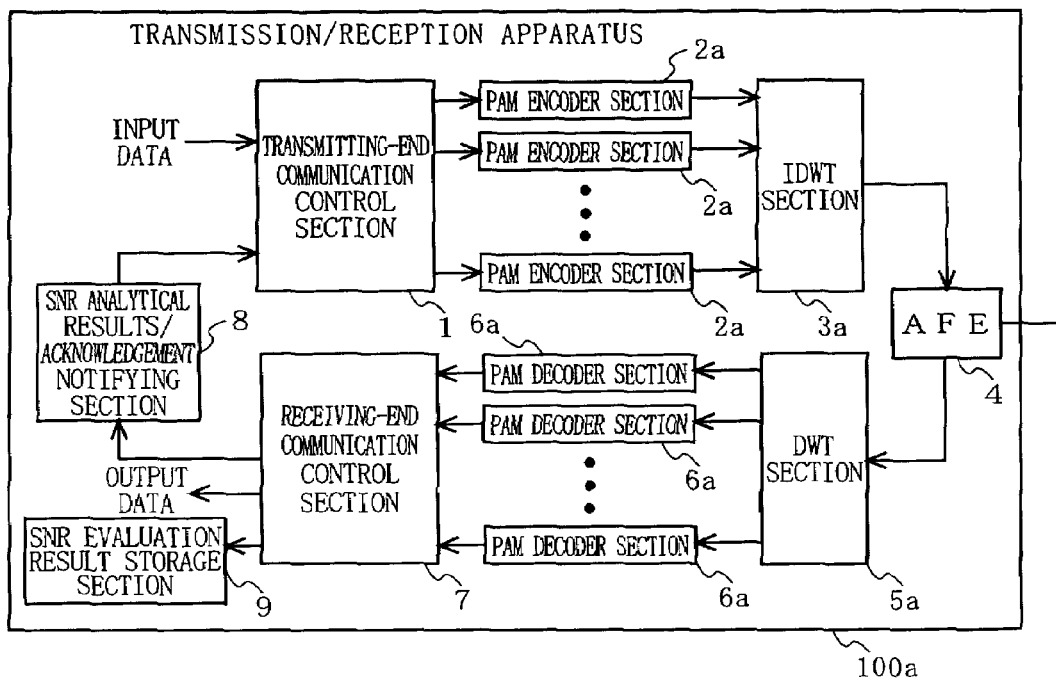
FIG. 5 is a block diagram illustrating the structure of transmission/reception apparatuses in the case where a Wavelet function is employed.
Figure 5:
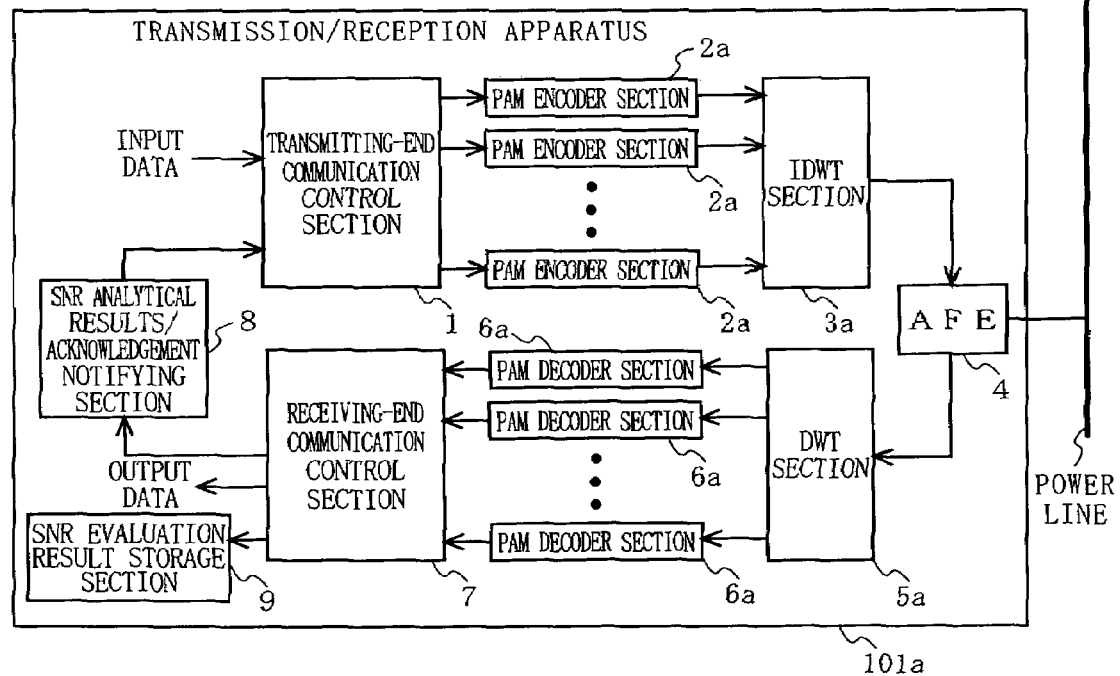

Note that, in the first embodiment, it is assumed that QAM is used as a modulation scheme, but it is not limited thereto. For example, BPSK, QPSK, PAM, or ASK modulation may be used as a modulation scheme. In the case where PAM is used as a modulation scheme, the transmission/reception apparatus will employ a DWT (Discrete Wavelet Transform) section and an IDWT (Inverse Discrete wavelet Transform) section, in which a Wavelet function is used as a basis function in place of a trigonometric function in an FFT section and an IFFT section. FIG. 5 is a block diagram illustrating the structure of transmission/reception apparatuses in the case where a Wavelet function is employed. As shown in FIG. 5, in the case where PAM encoder sections 2a and PAM decoder sections 6a are employed, an IDWT section 3a and a DWT section 5a are to be used. The effect of the present invention can also be obtained in such cases.

The above embodiment illustrates a case where, based on SNR analytical results corresponding to two training packets, the receiving end selects one analytical result and notifies it to the transmitting end. An essence of the present invention lies in the fact that: two instances of a channel estimation algorithm are executed with a time interval which is unequal to the interval between instances of cyclic noise and/or cyclic impedance fluctuations; based on a channel estimation result which dictates a faster total modulation speeds of the used carriers, the carrier to be used and/or the modulation parameter for each carrier are determined; and thereafter a communication is performed by using the carriers and the modulation parameters for the respective carriers. Therefore, it would be possible for the receiving end to return both of the analytical results for the two training packets to the transmitting end, and the transmitting end may select an SNR analytical result. Alternatively, both the transmitting end and the receiving end may select an SNR analytical result. Similar effects can be obtained in either case.

Second Embodiment

The transmission/reception apparatus according to the first embodiment prevents a decrease in the communication rate by performing two channel estimations and adopting one of the tone maps which dictates a faster PHY rate. Therefore, at a point where cyclic noise or impedance fluctuations are occurring, the packets are likely to contain errors. Therefore, in a second embodiment of the present invention, a function of retransmitting a packet to correct any packet which contains an error is provided in addition to the functions provided according to the first embodiment. The block structure of the transmission/reception apparatus of the second embodiment is identical to that in the first embodiment, and therefore FIG. 1 will be relied on in the following description.

Figure 6:
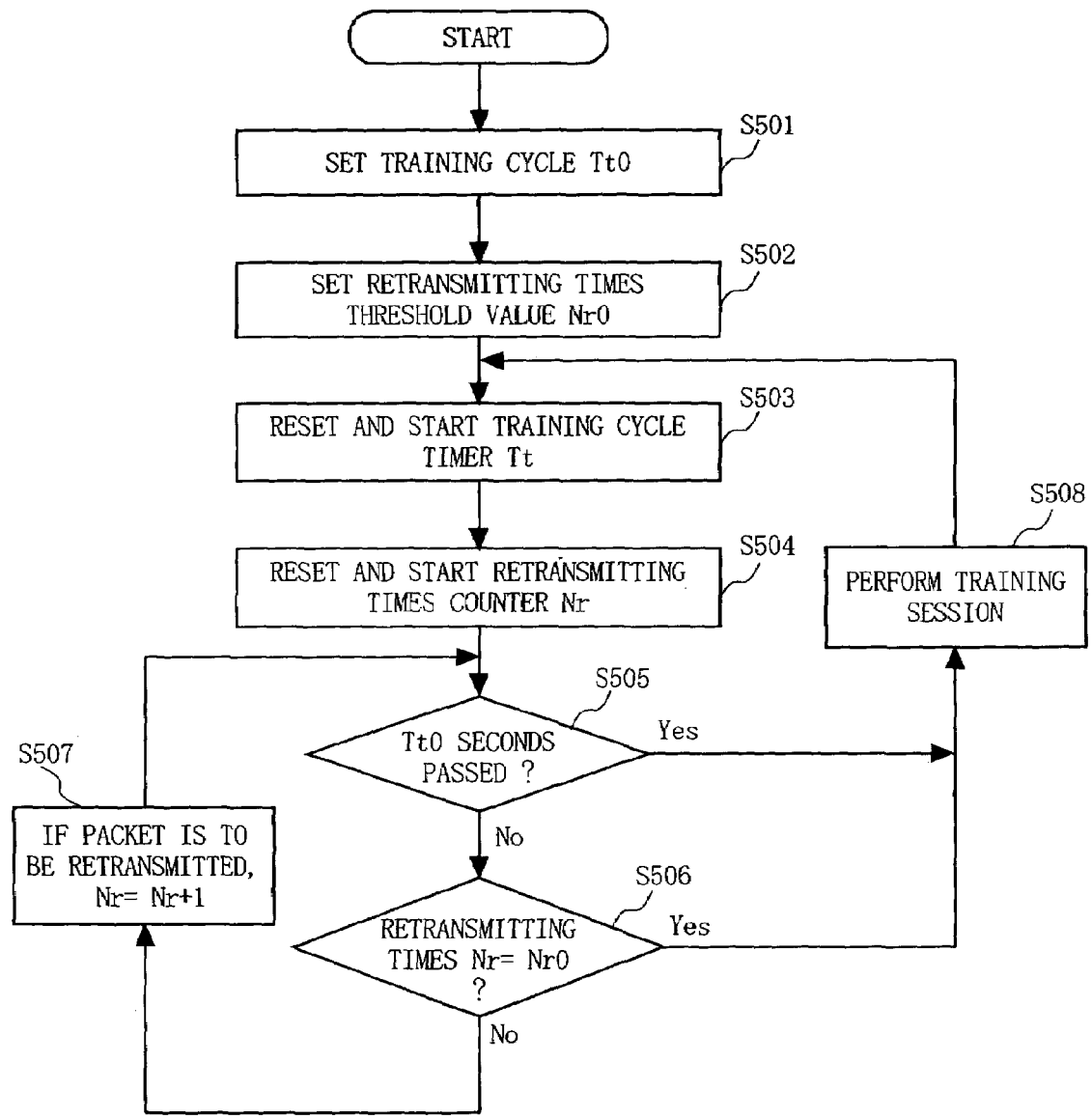
FIG. 6 is a flowchart illustrating an operation of a transmission/reception apparatus according to a second embodiment of the present invention.

FIG. 6 is a flowchart illustrating an operation of a transmission/reception apparatus according to the second embodiment of the present invention. Hereinafter, with reference to FIG. 6, an operation of the transmission/reception apparatus according to the second embodiment of the present invention will be described.

First, the transmitting-end communication control section 1 sets a training cycle Tt0 [seconds] defining a period during which to execute a training session (step S501). Next, the transmitting-end communication control section 1 sets a threshold value Nr0 [times] for the number of times of retransmission (step S502). Then, the transmitting-end communication control section 1 resets and starts a training cycle timer Tt [seconds] for counting training cycles (step S503). Next, the transmitting-end communication control section 1 resets and starts a retransmitting times counter Nr [times] for counting the number of times of retransmission (step S504).

Next, the transmitting-end communication control section 1 compares the training cycle timer Tt [seconds] against the training cycle Tt0 [seconds] to determine whether the training cycle Tt0 [seconds] has passed or not (step S505). If the training cycle Tt0 [seconds] has not passed yet, the transmitting-end communication control section 1 proceeds to the process of step S506. On the other hand, if the training cycle Tt0 [seconds] has passed, the transmitting-end communication control section 1 proceeds to the process of step S508.

At step S506, the transmitting-end communication control section 1 compares the retransmitting times counter Nr [times] against the retransmitting times threshold value Nr0 [times] to determine whether the retransmitting times has reached the retransmitting times threshold value, i.e., Nr=Nr0. If Nr=Nr0, the transmitting-end communication control section 1 proceeds to the process of step S508. On the other hand, if Nr=Nr0 is not true, the transmitting-end communication control section 1 proceeds to the process of step S507.

At step S507, the transmitting-end communication control section 1 transmits a packet, and returns to the process of step S505. If the packet to be transmitted is a packet for which an acknowledgement has not been obtained, i.e., if the packet is for retransmission, the transmitting-end communication control section 1 increments the retransmitting times counter Nr [times] by one (Nr=Nr+1), and returns to the process of step S505.

At step S508, the transmitting-end communication control section 1 performs a training session by transmitting first and second training packets in a manner similar to the first embodiment. The process of step S508 is to be executed when the training cycle is reached, or when the number of times of packet retransmission has exceeded the threshold value.

Thus, according to a second embodiment of the present invention, a packet for which an acknowledgement has not been obtained can be sent again. As a result, frame errors which occur in the presence of cyclic and local noise or cyclic and local impedance fluctuations can be corrected. Moreover, a training session is executed when the number of times of retransmitting packets has exceeded the threshold value. Thus, if the number of times of retransmission has become excessive, the transmission/reception apparatus can promptly perform a training session to change the modulation method to one that is suitable for the current state of the transmission path. Furthermore, a training session is to be performed when the training cycle is reached. Thus, by regularly monitoring the state of the transmission path, the transmission/reception apparatus can change the modulation method to a suitable one.

Third Embodiment

In the first embodiment, the receiving-end transmission/reception apparatus of training packets returns to the transmitting-end transmission/reception apparatus, as a channel estimation reply, an SNR analytical result containing a tone map which dictates a greater one of the PHY rates calculated from two tone maps which are determined in response to two channel estimation requests. This enables communications to be performed at a maximum transmission rate which is in accordance with the transmission path characteristics that exist at normal times. The above technique in the first embodiment is especially useful in the case where the ratio of the periods of time of poor SNR characteristics to the periods of time of good SNR characteristics is relatively small.

However, in the case where the ratio of the periods of time of poor SNR characteristics to the periods of time of good SNR characteristics is relatively large, i.e., the transmission path characteristics are poor, problems may arise with the technique of the first embodiment. The reason is that, in such a case, the period of time during which the actual PHY rate becomes maximum, i.e., the period of time during which the modulation parameter determined by using the technique of the first embodiment matches the transmission path characteristics, is short, thus inviting increased errors.

Moreover, in a tone map which dictates a maximum PHY rate, modulation methods with a high modulation level are assigned to a large number of sub-carriers. As the modulation level increases, a higher SNR is required. Therefore, using a tone map which dictates a maximum PHY rate results in a poor noise tolerance.

Thus, if a tone map which dictates a maximum PHY rate is used, errors are likely to occur when the modulation parameters do not match the transmission path characteristics during a data transmission, thereby resulting in a high retransmission rate. Therefore, a communication performed by using a tone map which dictates a maximum PHY rate does not necessarily guarantee that a MAC rate (application rate), which is a throughput (amount of information processed in a predetermined period of time) to be provided for an upper layer, is maximized.

Figure 7:
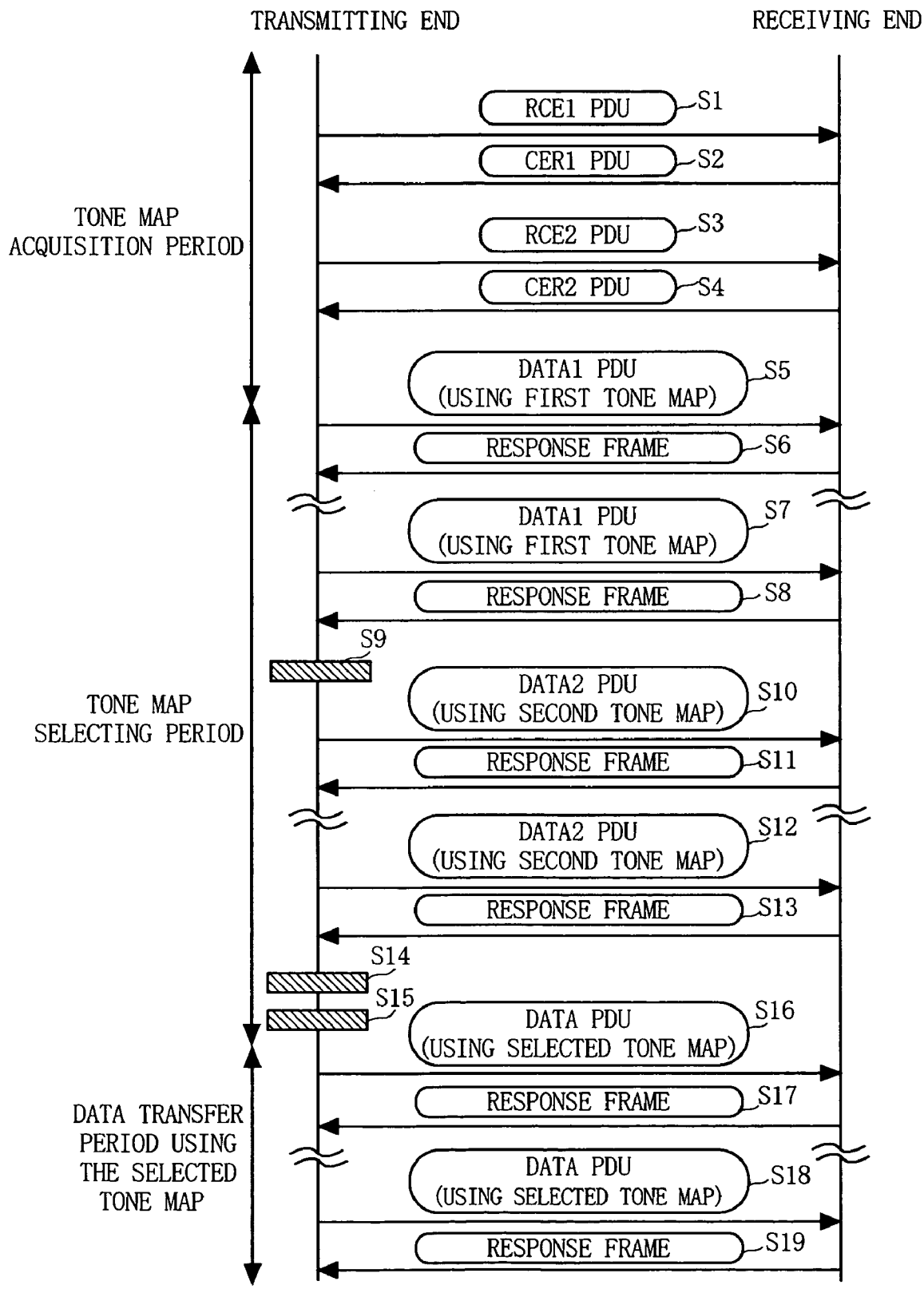
FIG. 7 is a sequence diagram illustrating a flow of processes performed in a communication network system according to a third embodiment of the present invention.

Accordingly, in the third embodiment, a system which ensures a maximum MAC rate is proposed. FIG. 7 is a sequence diagram illustrating a flow of processes performed in a communication network system according to the third embodiment of the present invention. Hereinafter, with reference to FIG. 7, a flow of processes performed in the communication system according to the third embodiment will be described.

First, a transmission/reception apparatus which is to transmit training packets transmits a channel estimation request packet RCE1PDU containing a first training packet to a receiving-end transmission/reception apparatus (step S1). In response, the receiving-end transmission/reception apparatus returns a channel estimation reply packet CER1PDU containing a first tone map to the transmitting-end transmission/reception apparatus (step S2). Next, the transmitting-end transmission/reception apparatus transmits a channel estimation request packet RCE2PDU containing a second training packet to the receiving-end transmission/reception apparatus (step S3). In response, the receiving-end transmission/reception apparatus returns a channel estimation reply packet CER2PDU containing a second tone map to the transmitting-end transmission/reception apparatus (step S4). In the transmitting-end transmission/reception apparatus, the period from steps S1 to S4 defines a tone map acquisition period for acquiring a tone map.

After the tone map acquisition period, the transmitting-end transmission/reception apparatus transmits a frame DATAPDU which is obtained by modulating input data using the first tone map (step S5). Next, the receiving-end transmission/reception apparatus checks for errors in the frame DATA1PDU which is transmitted from the transmitting-end transmission/reception apparatus, and upon detecting an error, returns a response frame, with retransmission request information contained therein, to the transmitting-end transmission/reception apparatus (step S6). Having received the response frame, the transmitting-end transmission/reception apparatus analyzes the content of the response frame, and if retransmission request information is found therein, retransmits the frame. The transmitting-end transmission/reception apparatus and the receiving-end transmission/reception apparatus repeat such exchanging of a packet DATA1PDU using the first tone map and a response frame, up to a predetermined number of times (steps S7, S8). After the above process, the transmitting-end transmission/reception apparatus calculates a data retransmission rate for the case of using the first tone map as [packet retransmitting times÷(number of transmitted packets+packet retransmitting times)](step S9).

After transmission/reception of packets using the first tone map, the transmitting-end transmission/reception apparatus transmits a packet DATA2PDU which is obtained by modulating input data using the second tone map (step S10). Next, the receiving-end transmission/reception apparatus checks for errors in the frame DATA2PDU which is transmitted from the transmitting-end transmission/reception apparatus, and upon detecting an error, returns a response frame, with retransmission request information contained therein, to the transmitting-end transmission/reception apparatus (step S11). The transmitting-end transmission/reception apparatus and the receiving-end transmission/reception apparatus repeat such exchanging of a packet DATA2PDU using the second tone map and a response frame, up to a predetermined number of times (steps S12, S13). After the above process, the transmitting-end transmission/reception apparatus calculates a data retransmission rate for the case of using the second tone map as [packet retransmitting times÷(number of transmitted packets+packet retransmitting times)] (step S14).

Next, the transmitting-end transmission/reception apparatus calculates MAC rates to be obtained in the cases where the first and second tone maps are used, and selects one of the tone maps which dictates the faster MAC rate (step S15). Specifically, the transmitting-end transmission/reception apparatus first calculates a PHY rate which is obtained by using the first tone map. Then, the transmitting-end transmission/reception apparatus calculates the MAC rate to be obtained in the case where the first tone map is used, by employing the retransmission rate calculated at step S9 (i.e., the retransmission rate in the case where data is actually transferred by using the first tone map). The formula for calculating the MAC rate is [MAC rate=PHY rate×(1-retransmission rate)]. Similarly, the transmitting-end transmission/reception apparatus calculates a PHY rate which is obtained by using the second tone map. Then, in accordance with the above formula, the transmitting-end transmission/reception apparatus calculates the MAC rate to be obtained in the case where the second tone map is used, by employing the retransmission rate calculated at step S14 (i.e., the retransmission rate in the case where data is actually transferred by using the second tone map). Then, the transmitting-end transmission/reception apparatus selects one of the tone map which dictates the higher MAC rate, and transmits the selected tone map to the receiving-end transmission/reception apparatus (step S15). The period during which data is actually transferred to obtain retransmission rates by using the first and second tone maps and MAC rates for the respective tone maps are calculated to determine a tone map which dictates the higher MAC rate will be referred to as a "tone map selecting period".

By using the selected tone map, the transmitting-end transmission/reception apparatus modulates data, and transmits a packet DATAPDU (steps S16, S18). In response, the receiving-end transmission/reception apparatus returns a response frame (steps S17, S19). The period during which data is transferred by using the selected tone map will be referred to as a "data transfer period using the selected tone map".

Thus, according to the third embodiment, the transmitting-end transmission/reception apparatus actually attempts data transfers by using two tone maps, thereafter selects a tone map which dictates a maximum MAC rate, and performs a data transfer. Therefore, the data can be transferred with few errors. Thus, modulation parameters which provide an optimum communication efficiency can be selected.

The above embodiment illustrates an example where the selecting condition for the tone map is that one which dictates a maximum MAC rate as calculated by using the above formula is selected. However, the selecting condition is not limited thereto. The selecting condition may be any selecting condition by which a tone map that dictates a maximum throughput to be provided for an upper layer is selected.

Figure 8:
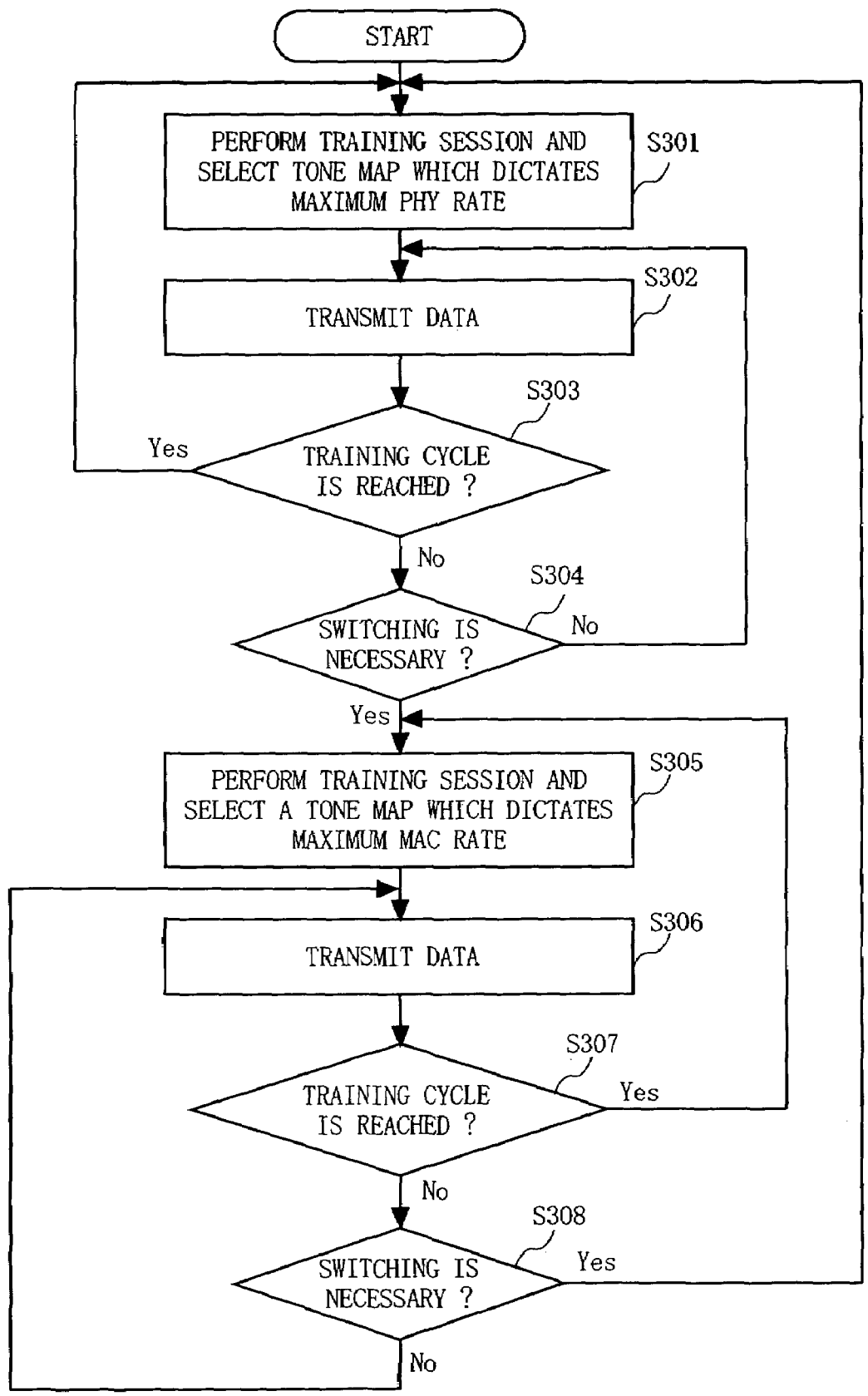
FIG. 8 is a flowchart illustrating an operation of a transmitting-end transmission/reception apparatus in the case where the apparatus switches between a training session for selecting a tone map which dictates a maximum PHY rate and a training session for selecting a tone map which dictates a maximum MAC rate.

In the above embodiment, a tone map which provides a maximum MAC rate is selected. Alternatively, it is applicable to switch between a training session for selecting a tone map which dictates a maximum PHY rate and a training session for selecting a tone map which dictates a maximum MAC rate as necessary, in accordance with the transmission path characteristics, e.g., temporal characteristics of SNR. FIG. 8 is a flowchart illustrating an operation of a transmitting-end transmission/reception apparatus in the case where the apparatus switches between a training session for selecting a tone map which dictates a maximum PHY rate and a training session for selecting a tone map which dictates a maximum MAC rate. Hereinafter, with reference to FIG. 8, an operation of the transmitting-end transmission/reception apparatus in the case of switching between a training session for selecting a tone map which dictates a maximum PHY rate and a training session for selecting a tone map which dictates a maximum MAC rate will be described.

First, the transmission/reception apparatus performs a training session in a manner similar to the first embodiment to select a tone map which dictates a maximum PHY rate (step S301). Then, the transmission/reception apparatus transmits data which is modulated by using the tone map selected at step S301 (step S302).

Next, the transmission/reception apparatus determines whether the training cycle has been reached or not (step S303). If the training cycle has been reached, the transmission/reception apparatus returns to the process of step S301 and performs a training session.

On the other hand, if the training cycle has not been reached, the transmission/reception apparatus determines whether it would be better to switch to selecting a tone map which dictates a maximum MAC rate (step S304). Specifically, the transmission/reception apparatus determines that it is better to switch to selecting a tone map which dictates a maximum MAC rate if the packet retransmission rate has a reached a predetermined value or more, or if the number of missing responses has reached a predetermined value or more.

When determining that it is unnecessary to switch to using a tone map which dictates a maximum MAC rate, the transmission/reception apparatus returns to the process of step S302. On the other hand, when determining that it is better to switch to using a tone map which dictates a maximum MAC rate, the transmission/reception apparatus performs a training session to select a tone map which dictates a maximum MAC rate (step S305), and proceeds to the process of step S306. Specifically, as shown in FIG. 7, the transmission/reception apparatus may acquire first and second tone maps during a tone map acquisition period; actually transmit data by using the first and second tone maps during a tone map selecting period; based on the result of transmission, calculate actual MAC rates; and transmit data using by using a tone map which dictates a maximum MAC rate during a data transfer period.

At step S306, the transmission/reception apparatus transmits data which is modulated by using the tone map selected at step S305.

Next, transmission/reception apparatus determines whether the training cycle has been reached (step S307). If the training cycle has been reached, the transmission/reception apparatus returns to the process of step S305.

On the other hand, if the training cycle has not been reached, the transmission/reception apparatus determines whether it would be better to switch to using a tone map which dictates a maximum PHY rate (step S308). Specifically, the transmission/reception apparatus determines that it is better to switch to selecting a tone map which dictates a maximum PHY rate if the packet retransmission rate is less than a predetermined value.

If it is determined at step S308 that it is better to switch to using a tone map which dictates a maximum PHY rate, the transmission/reception apparatus returns to the process of step S301. On the other hand, if it is determined unnecessary to switch to using a tone map which dictates a maximum PHY rate, the transmission/reception apparatus returns to the process of step S306.

Thus, by switching between a training session for selecting a tone map which dictates a maximum PHY rate and a training session for selecting a tone map which dictates a maximum MAC rate, it becomes possible to select an optimum tone map in accordance with the state of the transmission path. Since a tone map which dictates a maximum PHY rate is selected first, in the case where the state of the transmission path has not worsened, a tone map can be promptly determined in a training session.

Although an example is illustrated above where the aforementioned operation is performed to select a tone map at the time of newly installing a transmission/reception apparatus, the aforementioned operation may be regularly performed so as to select a tone map whenever necessary.

Fourth Embodiment

In the first to third embodiments above, the transmission/reception apparatus selects, from among two tone maps obtained in response to two channel estimation requests, a tone map which defines carriers to be used and/or modulation parameters for the respective carriers. According to a fourth embodiment of the present invention, the transmission/reception apparatus performs three or more channel estimations to acquire three or more tone maps, and from among the acquired tone maps, a tone map which dictates a maximum PHY or MAC rate is selected as described in the first to third embodiments. The block structure of the transmission/reception apparatus of the fourth embodiment is identical to that in the first embodiment, and therefore FIG. 1 will be relied on in the following description.

Figure 9A:
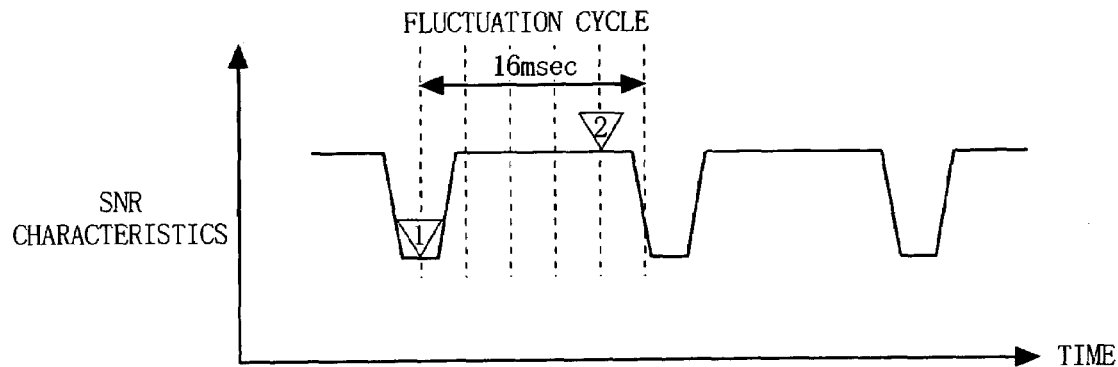
FIG. 9A is a graph illustrating the effects obtained by performing two channel estimations.
Figure 9B:
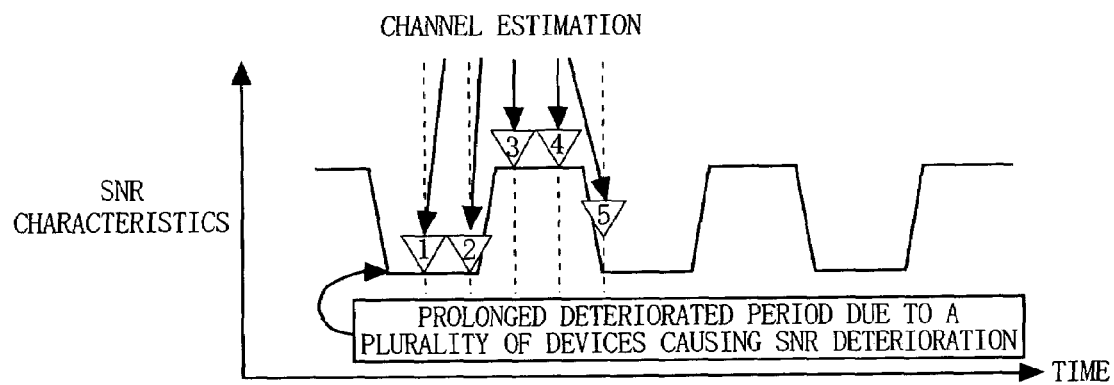
FIG. 9B is a graph illustrating the effects obtained by performing three or more channel estimations.
Figure 9C:
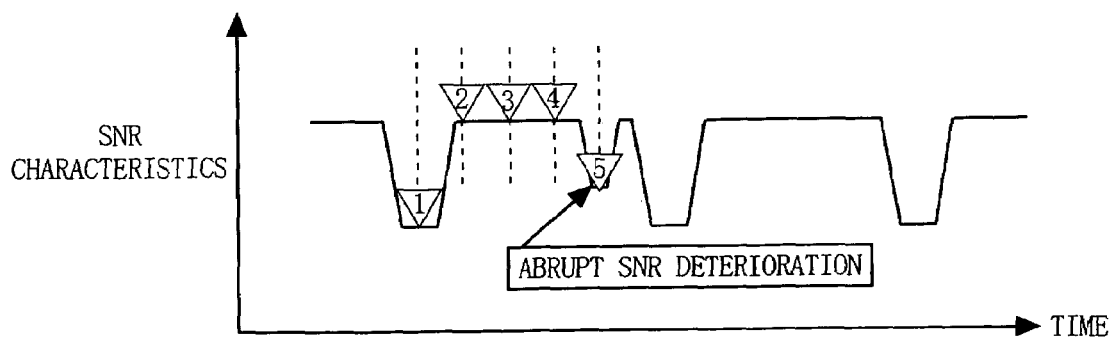
FIG. 9C is a graph illustrating the effects obtained by performing three or more channel estimations.

FIGS. 9A, 9B, and 9C are graphs illustrating the effects obtained by performing three or more channel estimations. Referring to FIG. 9A to 9C, effects obtained when performing three or more channel estimations will be described.

In FIG. 9A to 9C, the horizontal axis represents time, and the vertical axis represents cyclic noise or SNR for a frequency at which the SNR fluctuates due to impedance fluctuations. With reference to these figures, the relationship between channel estimation timing and the resultant SNR will be discussed.

FIG. 9A is a graph illustrating channel estimation timing in the case where two channel estimations are to be performed. In FIG. 9A, it is assumed that the period during which SNR is deteriorated is shorter than the period during which SNR is not deteriorated. In FIG. 9A, a first channel estimation timing (as shown by "1" in a triangular frame in the figure) coincides with the timing with which SNR deteriorates. A second channel estimation timing (as shown by "2" in a triangular frame in the figure) does not coincide with the timing with which SNR deteriorates. In the exemplary case shown in FIG. 9A, by using a tone map acquired through the second channel estimation, it is possible, even on a transmission path plagued with transmission path characteristics fluctuations, to prevent decrease in speed due to performing a communication using modulation parameters associated with low modulation speeds.

In the case where a plurality of devices causing cyclic fluctuations in the transmission path characteristics are connected to the transmission path, SNR characteristics as shown in FIG. 9B will be obtained. In the SNR characteristics as shown in FIG. 9B, each period during which SNR is deteriorated is prolonged than in the case shown in FIG. 9A. Therefore, given the SNR characteristics as shown in FIG. 9B, even if two channel estimations are performed (as shown by the timings "1" and "5" in triangular frames in the figure), both of the first and second timings may still coincide with the timing with which SNR deteriorates. In this case, appropriate modulation parameters cannot be selected for the transmission path characteristics which cyclically fluctuate over time.

Moreover, due to the influence of abrupt noise or the like, cyclically fluctuating SNR deteriorations and abrupt SNR deteriorations may exist as shown in FIG. 9C. In this case, the timing of an abrupt SNR deterioration may coincide with the channel estimation timing (as shown by "5" in a triangular frame in the figure). As a result, both of the first and second timings (as shown by the timings "1" and "5" in triangular frames in the figure) may coincide with the timing with which SNR deteriorates. In this case, appropriate modulation parameters cannot be selected for the transmission path characteristics which cyclically fluctuate over time.

Accordingly, in the fourth embodiment, three or more channel estimations are performed. FIGS. 9B and 9C illustrate examples where five channel estimations are performed. As shown in FIGS. 9B and 9C, as a result of performing five channel estimations, the transmission/reception apparatus can acquire a tone map through a channel estimation which was performed at a timing with which SNR did not deteriorate. Therefore, from among the five tone maps obtained, the transmission/reception apparatus can select a tone map which dictates a maximum PHY or MAC rate, in a manner similar to the first to third embodiments. In FIG. 9B, the tone maps obtained at timings "3" and "4" are the tone maps which are obtained through channel estimations which were performed at a timing with which SNR did not deteriorate. In FIG. 9C, the tone maps obtained at timings "2", "3" and "4" are the tone maps which are obtained through channel estimations which were performed at a timing with which SNR did not deteriorate.

Thus, in the presence of cyclic noise, or in the case where a plurality of devices causing impedance fluctuations in the transmission path characteristics are connected to power line, or in the presence of abrupt noise/impedance fluctuations, the transmission/reception apparatus performs three or more channel estimations. As a result, it becomes possible to select an even more appropriate tone map than in the case where tone maps are obtained through two channel estimations, without being influenced by prolongation of the periods during which SNR is deteriorated or abrupt fluctuations in the transmission path characteristics, whereby high speed transmission can be realized. Depending on the degree of fluctuations in the transmission path characteristics, the transmission/reception apparatus may dynamically vary the number of channel estimations to be performed or intervals therebetween, thus further enhancing the effects of the present invention.

Figure 10:
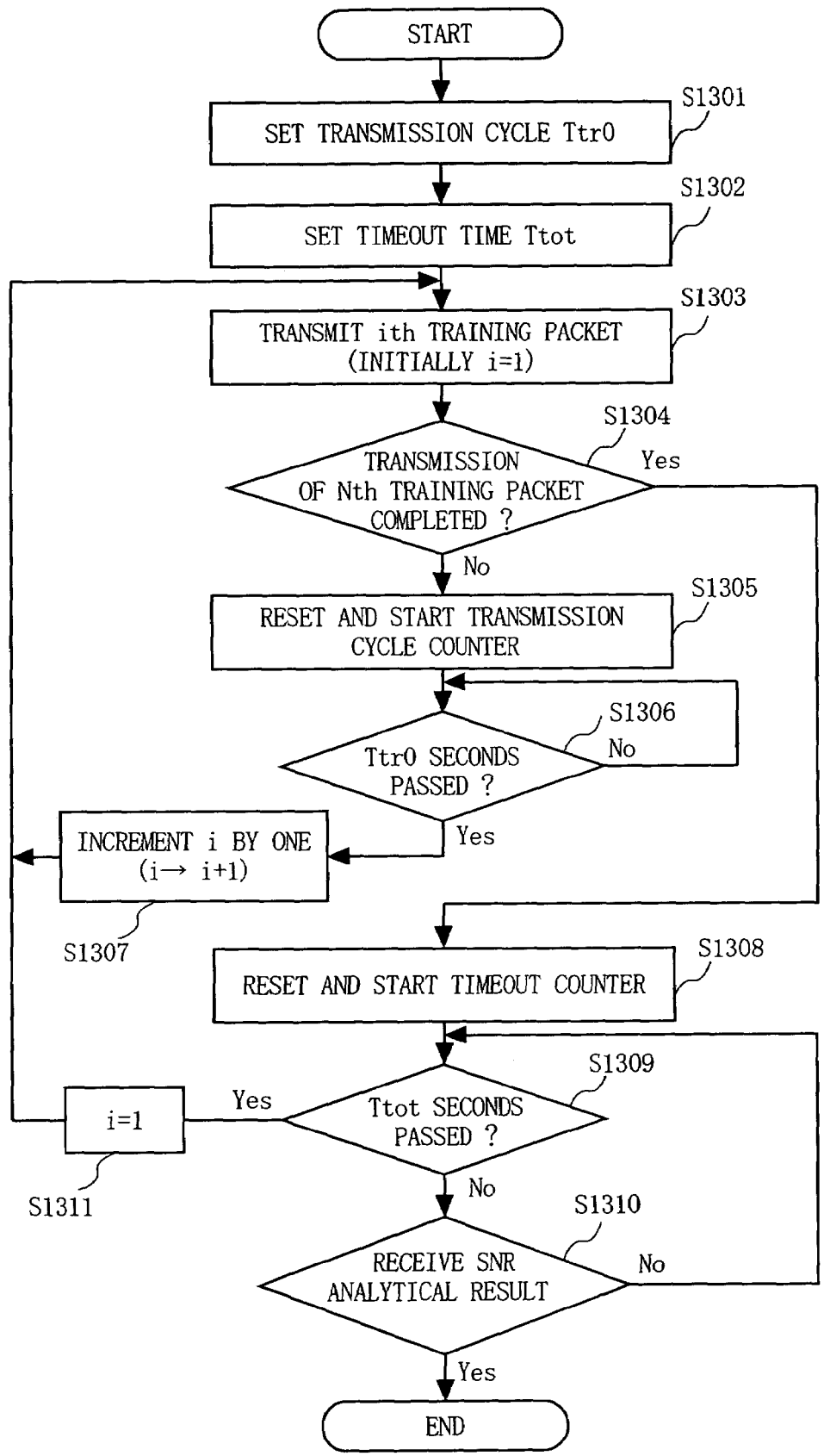
FIG. 10 is a flowchart illustrating an operation of a transmission/reception apparatus which transmits training packets during a training session according to a fourth embodiment of the present invention.

FIG. 10 is a flowchart illustrating an operation of a transmission/reception apparatus which transmits training packets during a training session according to the fourth embodiment. Hereinafter, with reference to FIG. 10, an operation of the transmission/reception apparatus which transmits training packets during a training session according to the fourth embodiment will be described.

First, the transmitting-end communication control section 1 of the transmitting-end transmission/reception apparatus sets a transmission cycle Ttr0 [seconds] as a time interval between transmissions of training packets (step S1301). The transmission cycle Ttr0 [seconds] is neither an integer multiple of the cycle of the commercial electric power nor an integer multiple of half the cycle of the commercial electric power. In other words, the time interval between two adjacent instances of the channel estimation algorithm to be executed is unequal to the cycle of the quality fluctuations on the power line, and is equal neither to an integer multiple of the cycle of the commercial electric power nor to an integer multiple of half the cycle of the commercial electric power.

Next, the transmitting-end communication control section 1 sets a timeout time Ttot [seconds] (step S1302).

Next, the transmitting-end communication control section 1 transmits an $i^{th}$ training packet (step S1303), where i is a positive integer whose initial value is one. The $i^{th}$ training packet has identification information added thereto, which can be used at a receiving end to confirm that it is the $i^{th}$ training packet.

Next, the transmitting-end communication control section 1 determines whether the transmission of an $N^{th}$ training packet has been completed (step S1304). If it has been completed, the transmitting-end communication control section 1 proceeds to the process of step S1308. On the other hand, if it has not been completed, the transmitting-end communication control section 1 proceeds to the process of step S1305.

At step S1305, the transmitting-end communication control section 1 resets and starts a transmission cycle counter for measuring time to determine whether the transmission cycle has been reached (step S1305).

Next, by referring to the transmission cycle counter, the transmitting-end communication control section 1 determines whether the transmission cycle Ttr0 [seconds] has passed or not (step S1306). The transmitting-end communication control section 1 repeats the process of step S1306 until the transmission cycle Ttr0 [seconds] has passed. If the transmission cycle Ttr0 [seconds] has passed, the transmitting-end communication control section 1 proceeds to the process of step S1307.

At step S1307, the transmitting-end communication control section 1 increments i by one, and returns to the process of step S1303 to transmit a next training packet.

At step S1308, the transmitting-end communication control section 1 resets and starts a timeout counter for measuring time to determine whether the timeout time has passed (step S1308).

Next, by referring to the timeout counter, the transmitting-end communication control section 1. determines whether the timeout time Ttot [seconds] has passed or not (step S1309). If the timeout time Ttot [seconds] has passed, the transmitting-end communication control section 1 sets i=1 (step S1311), and returns to the processes of steps S1303 and the subsequent steps to retransmit the first to $N^{th}$ training packets. On the other hand, if the timeout time Ttot [seconds] has not passed, the transmitting-end communication control section 1 proceeds to the process of step S1310.

At step S1310, the transmitting-end communication control section 1 determines whether the receiving-end communication control section 7 has received an SNR analytical result from the counterparting transmission/reception apparatus and whether the received SNR analytical result has been notified to the SNR analytical results/acknowledgement notifying section 8. If an SNR analytical result has not been received, the transmitting-end communication control section 1 returns to the process of step S1309. On the other hand, if an SNR analytical result has been received, the transmitting-end communication control section 1 ends the process. Thereafter, based on the received SNR analytical result, the transmitting-end communication control section 1 allocates input data to the QAM encoder sections 2, and transmits packets.

Figure 11:
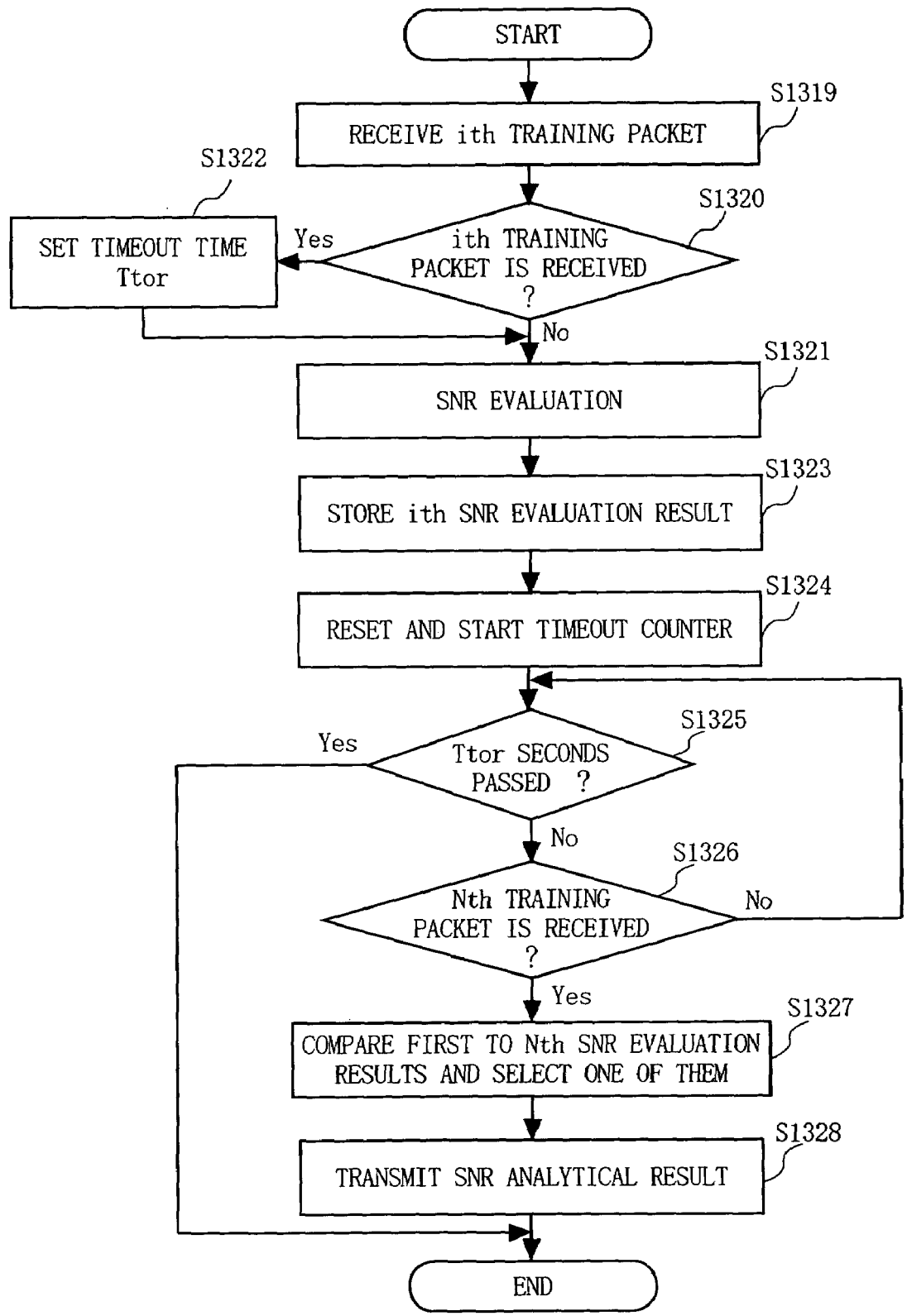
FIG. 11 is a flowchart illustrating an operation of a transmission/reception apparatus which receives training packets during a training session according to a fourth embodiment of the present invention.

FIG. 11 is a flowchart illustrating an operation of a transmission/reception apparatus which receives training packets during a training session according to the fourth embodiment. Hereinafter, with reference to FIG. 11, an operation of the transmission/reception apparatus which receives training packets during a training session according to the fourth embodiment will be described.

First, upon receiving an $i^{th}$ training packet (step S1319), the receiving-end communication control section 7 in the receiving-end transmission/reception apparatus begins the following operation. Note that the receiving-end communication control section 7 determines whether the transmitted packet is an $i^{th}$ training packet or not based on the identification information which is added to the $i^{th}$ training packet.

Next, the receiving-end communication control section 7 determines whether the received packet is the first training packet or not (step S1320). If it is the first training packet, the receiving-end communication control section 7 sets a timeout time Ttor [seconds] (step S1322), and proceeds to the process of step S1321. On the other hand, if the received packet is not the first training packet, the receiving-end communication control section 7 proceeds to the process of step S1321.

At step S1321, the receiving-end communication control section 7 evaluates the SNR of the received training packet.

Next, the receiving-end communication control section 7 stores the evaluation result of the SNR of the $i^{th}$ training packet obtained at step S1321 to the SNR evaluation result storage section 9, as an $i^{th}$ SNR evaluation result (step S1323).

Next, the receiving-end communication control section 7 resets and starts a timeout counter for measuring time to determine whether the timeout time has passed (step S1324).

Next, by referring to the timeout counter, the receiving-end communication control section 7 determines whether the timeout time Ttor [seconds] has passed or not (step S1325). If the timeout time Ttor [seconds] has passed, the receiving-end communication control section 7 ends the process. On the other hand, if the timeout time Ttor [seconds] has not passed, the receiving-end communication control section 7 proceeds to the process of step S1326.

At step S1326, the receiving-end communication control section 7 determines whether an $N^{th}$ training packet is being received or not. If an $N^{th}$ training packet is not being received, the receiving-end communication control section 7 returns to the process of step S1325. On the other hand, if an $N^{th}$ training packet is being received, the receiving-end communication control section 7 proceeds to the process of step S1327.

At step S1327, the receiving-end communication control section 7 determines a tone map for each of the first to $N^{th}$ SNR evaluation results stored in the SNR evaluation result storage section 9. By comparing all such tone maps, the receiving-end communication control section 7 selects an SNR evaluation result which dictates the fastest PHY rate.

Next, as an SNR analytical result, the receiving-end communication control section 7 transmits the SNR evaluation result selected at step S1327 to the transmission/reception apparatus which has transmitted the training packet (step S1328), and ends the process. Based on the received SNR analytical result, the transmission/reception apparatus which has transmitted the training packet allocates input data to the QAM encoder sections 2, and transmits packets.

In FIG. 10 and FIG. 11, steps S1303 to S1306 and steps S1319 to S1324 correspond to the $i^{th}$ instance of the channel estimation algorithm.

Thus, according to the fourth embodiment of the present invention, the transmission/reception apparatus performs three or more channel estimations. Therefore, it becomes possible to select an even more appropriate tone map than in the case where tone maps are obtained through two channel estimations, without being influenced by prolongation of the periods during which SNR is deteriorated or abrupt fluctuations in the transmission path characteristics, whereby high speed transmission can be realized.

In the fourth embodiment, too, data may be retransmitted in a manner as described in the second embodiment.

The fourth embodiment illustrates an example where an SNR evaluation result map which dictates a maximum PHY rate is selected. Alternatively, as described in the third embodiment, a tone map may be determined by selecting an SNR evaluation result which dictates a maximum MAC rate. Specifically, during a tone map acquisition period, the transmitting-end transmission/reception apparatus may receive first to $N^{th}$ tone maps, which are obtained with the first to $N^{th}$ training packets, from the receiving-end transmission/reception apparatus each time one of the first to $N^{th}$ training packets is transmitted, and keep a record of the first to Nth tone maps. Then, during a tone map selecting period, the transmitting-end transmission/reception apparatus may actually transmit data modulated using the first to $N^{th}$ tone maps acquired during the tone map acquisition period, while recording the number of times of packet retransmission, and calculate and record a MAC rate for each tone map in a manner similar to the third embodiment. Then, the transmitting-end transmission/reception apparatus may determine the tone map which dictates a maximum calculated MAC rate, and transfer data by using the tone map during a data transfer period.

Note that the transmitting-end transmission/reception apparatus may receive tone maps for N training packets from the receiving-end transmission/reception apparatus; rank the received tone maps in a descending order of total modulation speeds of the carriers; nominate tone maps whose ranks are higher than a predetermined rank as prospective tone maps to be selected; perform actual communications using the prospective tone maps; and select a tone map which dictates a maximum MAC rate from among the prospective tone maps. Thus, it becomes unnecessary for the transmitting-end transmission/reception apparatus to perform actual communications by using all tone maps, thereby making it possible to change the carriers to be used and/or the modulation parameters for each carrier in a more rapid response to the transmission path characteristics fluctuations.

In the fourth embodiment, too, it is possible to switch between a training session for selecting a tone map which dictates a maximum PHY rate and a training session for selecting a tone map which dictates a maximum MAC rate, as illustrated in FIG. 8.

Note that, in the second to fourth embodiments above, it is assumed that QAM is used as a modulation scheme, but it is not limited thereto. For example, BPSK, QPSK, PAM, or ASK modulation may be used as a modulation scheme. In the case where PAM is used as a modulation scheme, the transmission/reception apparatus will employ a DWT (Discrete Wavelet Transform) section and an IDWT (Inverse Discrete Wavelet Transform) section, in which a Wavelet function is used as a basis function in place of a trigonometric function in an FFT section and an IFFT section. The effect of the present invention can also be obtained in such cases.

Although the above embodiments illustrate examples where a power line is employed as a transmission path for connecting transmission/reception apparatuses on a communication network system to each other, the present invention is not limited thereto. Any transmission path other than a power line, e.g., a wireless means or a cable for a cable LAN, may be employed. In either case, it is to be ensured that the time interval between two instances of the channel estimation algorithm to be executed is unequal to the cycle of quality fluctuations on the transmission path.

The above embodiments illustrate examples where SNR is analyzed as an index representing a transmission quality on the transmission path at each carrier frequency. However, any other index may be used so long as it represents a transmission quality on the transmission path.

Note that the above-described embodiments can be realized by causing a CPU to execute a program, which is able to cause a CPU to execute the above-described procedure stored in a recording medium (a ROM, a RAM, or a hard disk, etc.). In this case, the program may be executed after it is stored in a storing device via a recording medium, or may be directly executed from the recording medium. Here, the recording medium includes a ROM, a RAM, a semiconductor memory such as a flash memory, a magnetic disk memory such as a flexible disk and a hard disk, an optical disk such as a CD-ROM, a DVD, and a BD, a memory card, or the like. The "recording medium" as mentioned herein is a notion including a communication medium such as a telephone line and a carrier line.

Note that each functional block as shown in FIGS. 1 and 5 may be realized as an LSI, which is an integrated circuit. Each functional block may be separately constructed in a chip form, or may be constructed in a chip form so that a portion or the entire portion thereof is included. The LSI may be referred to as an IC, a system LSI, a super LSI, or an ultra LSI, etc., depending on the degree of integration. Also, the method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used. Further, in the case where another integration technology replacing LSI becomes available due to improvement of a semiconductor technology or due to the emergence of another technology derived therefrom, integration of the functional blocks may be performed using such a new integration technology. For example, biotechnology may be applied to the above-described integration.

Figure 12:
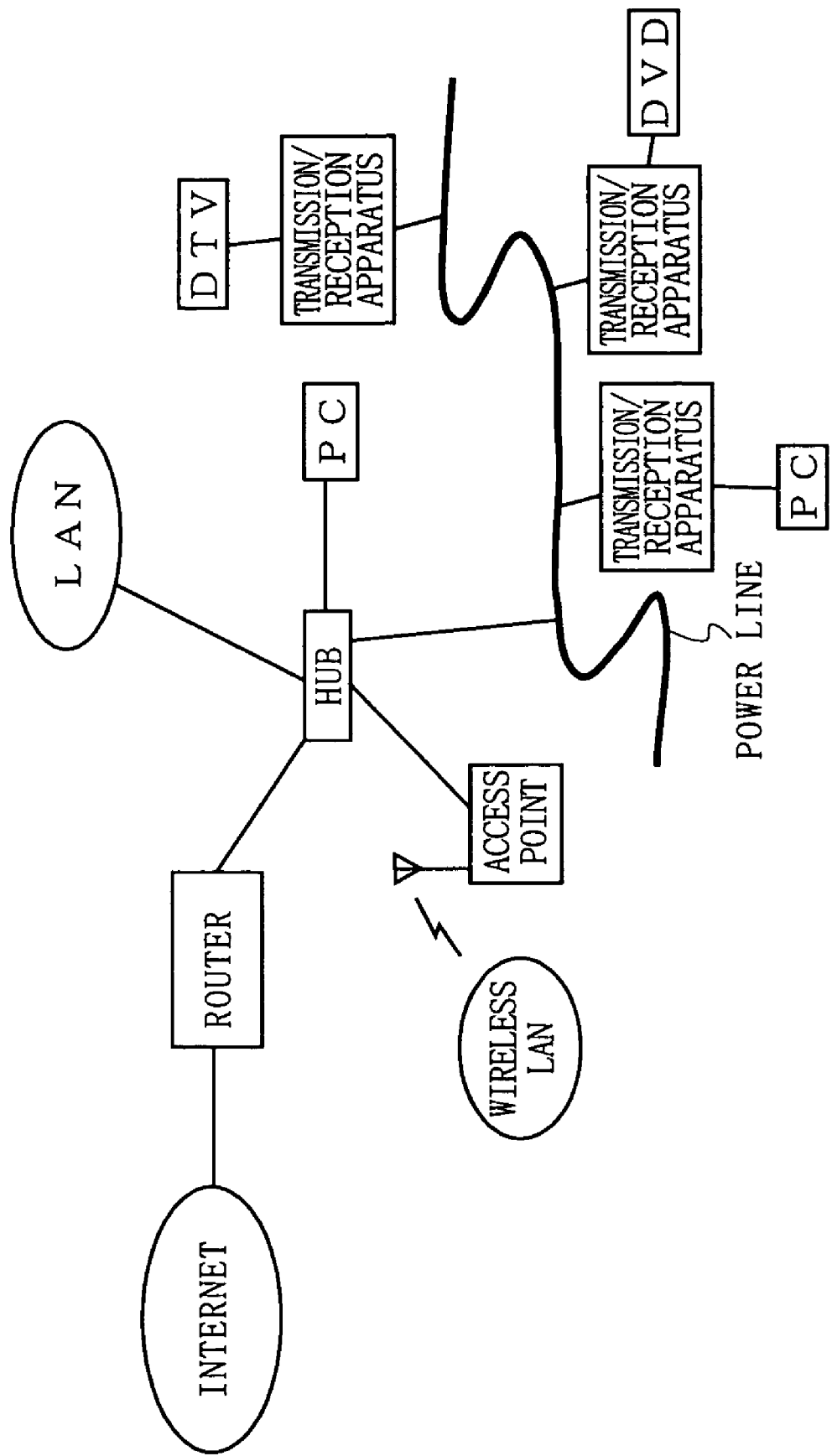
FIG. 12 is a diagram illustrating the overall system structure in the case where the transmission/reception apparatuses according to the present invention are applied to high-speed power line transmission.
Figure 13:
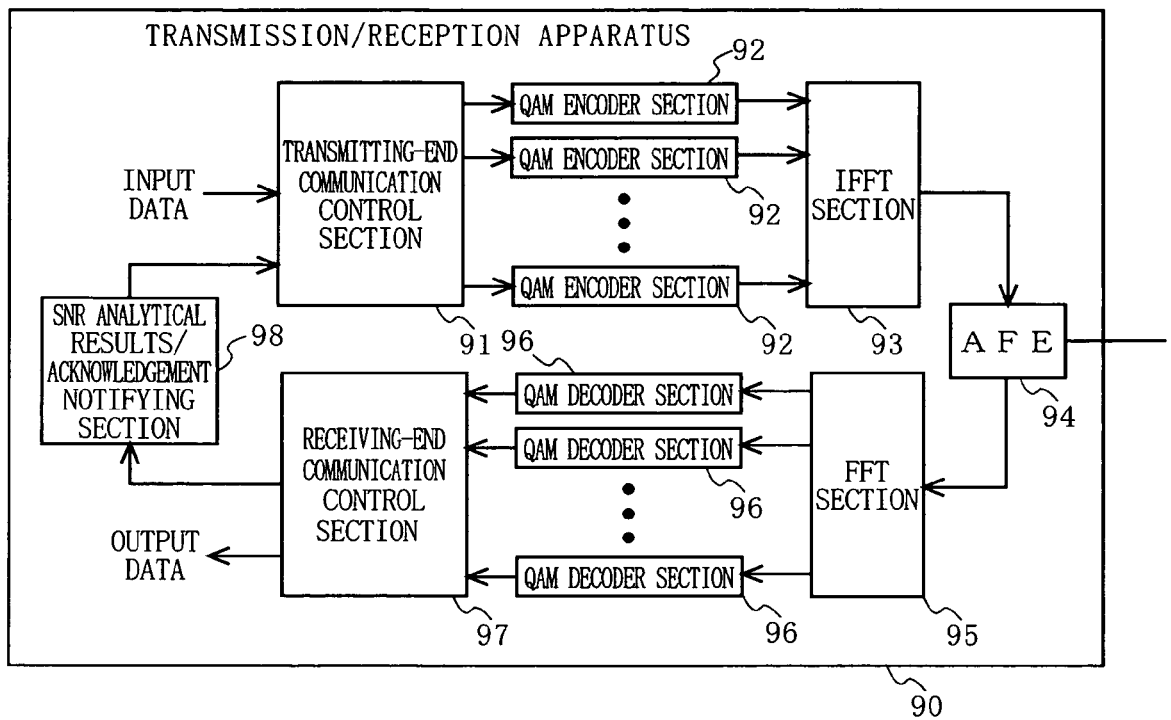
FIG. 13 is a block diagram showing a structure of a transmission/reception apparatus 90 defined by HomePlug1.0.

Hereinafter, an example to which each of the above-described embodiments is applied will be described. FIG. 12 is a diagram illustrating the overall structure of a system in the case where the transmission/reception apparatus of the present invention is applied to a high-speed power line transmission. As shown in FIG. 12, the transmission/reception apparatus of the present invention provides an interface between a multimedia device such as a digital TV (DTV), a personal computer (PC), and a DVD recorder, etc., and a power line. An IEEE1394 interface, a USB interface, or an Ethernet (R) interface may be used as an interface between the multimedia device and the transmission/reception apparatus of the present invention. As such, a communication network system is configured to transmit digital data such as multimedia data at high speed via a power line. As a result, unlike in a conventional cable LAN, it is possible to use a power line, which has already been installed in a home and an office, etc., as a network line without the need for installation of a network cable. Thus, the present invention can be easily installed at low cost, thereby substantially improving user-friendliness.

In the embodiment as shown in FIG. 12, the transmission/reception apparatus of the present invention is used as an adapter for converting a signal interface of an existing multimedia device to a power line communication interface. However, the transmission/reception apparatus of the present invention may be built into a multimedia device such as a personal computer, a DVD recorder, a digital video, and a home server system. As a result, it is possible to perform data transmission between the devices via a power cord of the multimedia device. It eliminates the need for wiring to connect an adapter and a power line, an IEEE1394 cable, a USB cable, and an Ethernet (R) cable, etc., whereby wiring can be simplified.

Also, the network system using a power line can be connected to the Internet, a wireless LAN, and a conventional cable LAN via a router and/or a hub. Thus, it is possible to extend a LAN system using the communication network system of the present invention without any difficulty.

Also, communication data transmitted over a power line by a power line transmission is received by an apparatus by directly connecting to a power line. As a result, it is possible to eliminate leakage and interception of data, which become a problem of wireless LAN. Thus, the power line transmission method is advantageous from a security standpoint. It will be understood that data transmitted over a power line may be protected by an IPSec, which is an extended IP protocol, encryption of contents, other DRM schemes, and the like.

As such, it is possible to perform a high-quality power line transmission of AV contents by realizing copyright protection by the above-described encryption of contents, and by realizing a communication network system which allows communication parameters to be set so that the system can operate with a maximum communication rate without being affected by local noise/impedance fluctuations occurring therein, which is an effect of the present invention.

The present invention makes it possible to perform high-speed communications on the order of tens of 10 Mbps to hundreds of Mbps on a power line, and is applicable to any field where LAN connections are to be realized without the need to provide additional wiring, e.g., Internet-compatible home network devices, Internet-connected home appliances, local area networks, OA (Office Automation), FA (Factory Automation), and the like.

While the invention has been described in detail, the foregoing description is in all aspects illustrative and not restrictive. It is understood that numerous other modifications and variations can be devised without departing from the scope of the invention.

What is claimed is:

1. A transmission/reception apparatus for transmitting a signal which is modulated based on input data to another apparatus on a communication network, and receiving a signal from another apparatus on the communication network and demodulating the received signal, comprising:
    a multicarrier-modulation transmission section for modulating a plurality of carriers having respectively different frequencies based on the input data, and transmitting the modulated signal to another apparatus on the communication network;
    a multicarrier reception/demodulation section for receiving a multicarrier-modulated signal transmitted from another apparatus on the communication network and demodulating the multicarrier-modulated signal; and
    a control section for, if a predetermined activation condition is satisfied, communicating with another apparatus on the communication network acting as a counterpart of communication, executing two or more instances of a channel estimation algorithm for evaluating transmission quality on a transmission path with respect to a frequency of each carrier, and controlling, based on the transmission quality evaluated through the two or more instances of the channel estimation algorithm executed, a modulation rule to be used in the multicarrier-modulation transmission section or a demodulation rule to be used in the multicarrier reception/demodulation section,
    wherein the transmission path is a power line to which commercial electric power is applied, and
    a time interval between two adjacent instances of the channel estimation algorithm to be executed is unequal to an integer multiple of a cycle of the commercial electric power and unequal to an integer multiple of half the cycle of the commercial electric power.

2. The transmission/reception apparatus according to claim 1, wherein,
    in each instance of the channel estimation algorithm, the control section derives, as an evaluation result of transmission quality on the transmission path with respect to the frequency of each carrier, a set of modulation/demodulation rules for the multicarrier-modulation transmission section and the multicarrier reception/demodulation section enabling transmission or reception of the signal without deterioration in the transmission quality, and
    the control section calculates a communication rate in a physical layer to be obtained when using each set of modulation/demodulation rules, and selects one of the sets of modulation/demodulation rules that dictates a maximum communication rate as the set of modulation/demodulation rules to be used in the multicarrier-modulation transmission section and the multicarrier reception/demodulation section.

3. The transmission/reception apparatus according to claim 2, wherein,
    in each instance of the channel estimation algorithm, the control section evaluates transmission quality on the transmission path by determining a signal-to-noise ratio on the transmission path with respect to the frequency of each carrier, and derives a set of modulation/demodulation rules for the multicarrier-modulation transmission section and the multicarrier reception/demodulation section by allocating, for any carrier having a signal-to-noise ratio which is equal to or greater than a predetermined threshold value, a modulation level which is in accordance with the value of the signal-to-noise ratio, and by ensuring that any carrier having a signal-to-noise ratio which is less than the predetermined threshold value is not used,
    based on the modulation level for each carrier, the control section calculates the communication rate to be obtained when using each set of modulation/demodulation rules, and selects one of the sets of modulation/demodulation rules that dictates a maximum communication rate as the set of modulation/demodulation rules to be used in the multicarrier-modulation transmission section and the multicarrier reception/demodulation section.

4. The transmission/reception apparatus according to claim 1, wherein, in each instance of the channel estimation algorithm, the control section derives, as an evaluation result of transmission quality on the transmission path with respect to the frequency of each carrier, a set of modulation/demodulation rules for the multicarrier-modulation transmission section and the multicarrier reception/demodulation section enabling transmission or reception of the signal without deterioration in the transmission quality, and the control section calculates a throughput to be provided for an upper layer when using each set of modulation/demodulation rules, and selects one of the sets of modulation/demodulation rules that dictates a maximum throughput as the set of modulation/demodulation rules to be used in the multicarrier-modulation transmission section and the multicarrier reception/demodulation section.

5. The transmission/reception apparatus according to claim 4, wherein, in each instance of the channel estimation algorithm, the control section evaluates transmission quality on the transmission path by determining a signal-to-noise ratio on the transmission path with respect to the frequency of each carrier, and derives a set of modulation/demodulation rules for the multicarrier-modulation transmission section and the multicarrier reception/demodulation section by allocating, for any carrier having a signal-to-noise ratio which is equal to or greater than a predetermined threshold value, a modulation level which is in accordance with the value of the signal-to-noise ratio, and by ensuring that any carrier having a signal-to-noise ratio which is less than the predetermined threshold value is not used, and the control section causes the multicarrier-modulation transmission section to actually transmit a signal by using each of the derived sets of modulation/demodulation rules, calculates the throughput for each set of modulation/demodulation rules based on a data retransmission rate, and selects one of the sets of modulation/demodulation rules that dictates a maximum throughput as the set of modulation/demodulation rules to be used in the multicarrier-modulation transmission section and the multicarrier reception/demodulation section.

6. The transmission/reception apparatus according to claim 1 wherein, the control section includes:

PHY rate modulation/demodulation rules determination means for deriving, in each instance of the channel estimation algorithm, as an evaluation result of transmission quality on the transmission path with respect to the frequency of each carrier, a set of modulation/demodulation rules for the multicarrier-modulation transmission section and the multicarrier reception/demodulation section enabling transmission or reception of the signal without deterioration in the transmission quality, calculates a communication rate in a physical layer to be obtained when using each of the derived sets of modulation/demodulation rules, and selecting one of the sets of modulation/demodulation rules that dictates a maximum communication rate as the set of modulation/demodulation rules to be used in the multicarrier-modulation transmission section and the multicarrier reception/demodulation section;

MAC rate modulation/demodulation rules determination means for deriving, in each instance of the channel estimation algorithm, as an evaluation result of transmission quality on the transmission path with respect to the frequency of each carrier, a set of modulation/demodulation rules for the multicarrier-modulation transmission section and the multicarrier reception/demodulation section enabling transmission or reception of the signal without deterioration in the transmission quality, calculating a throughput to be provided for an upper layer when using each of the derived sets of modulation/demodulation rules, and selecting one of the sets of modulation/demodulation rules which dictates a maximum throughput as the set of modulation/demodulation rules to be used in the multicarrier-modulation transmission section and the multicarrier reception/demodulation section; and switching means for, based on a predetermined condition, switching between selecting the set of modulation/demodulation rules to be used by employing the PHY rate modulation/demodulation rules determination means or selecting the set of modulation/demodulation rules to be used by employing the MAC rate modulation/demodulation rules determination means.

7. The transmission/reception apparatus according to claim 1, wherein the control section retransmits data if the data is not correctly received by the other apparatus acting as the counterpart of communication.

8. The transmission/reception apparatus according to claim 1, wherein the control section further comprises transmission quality evaluation means for, in response to a channel estimation algorithm executed by the other apparatus on the communication network acting as the counterpart of communication, evaluating transmission quality on the transmission path with respect to the frequency of each carrier, and returning a result of each evaluation to the other apparatus.

9. The transmission/reception apparatus according to claim 8, wherein, based on the evaluation of the transmission quality on the transmission path with respect to the frequency of each carrier, the transmission quality evaluation means derives a set of modulation/demodulation rules for each instance of the channel estimation algorithm, calculates a communication rate in a physical layer to be obtained when using each of the sets of modulation/demodulation rules, and returns one of the sets of modulation/demodulation rules that dictates a maximum communication rate to the other apparatus.

10. The transmission/reception apparatus according to claim 1, wherein, based on evaluation results of transmission quality on the transmission path with respect to the frequency of each carrier which is sent from the other apparatus on the communication network acting as the counterpart of communication in response to each instance of the channel estimation algorithm, the control section derives a set of modulation/demodulation rules for each instance of the channel estimation algorithm, calculates a communication rate in a physical layer to be obtained when using each of the sets of modulation/demodulation rules, and selects one of the sets of modulation/demodulation rules that dictates a maximum communication rate as the set of modulation/demodulation rules to be used in the multicarrier-modulation transmission section and the multicarrier reception/demodulation section.

11. A communication network system for allowing a signal which is modulated based on input data to be transmitted or received between first and second transmission/reception apparatuses, the first transmission/reception apparatus comprising:

a first multicarrier-modulation transmission section for modulating a plurality of carriers having respectively different frequencies based on the input data, and transmitting the modulated signal to the second transmission/reception apparatus;

a first multicarrier reception/demodulation section for receiving and demodulating the multicarrier-modulated signal transmitted from the second transmission/reception apparatus; and a first control section for, if a predetermined activation condition is satisfied, communicating with the second transmission/reception apparatus, executing two or more instances of a channel estimation algorithm for evaluating transmission quality on a transmission path with respect to a frequency of each carrier, and controlling, based on the transmission quality evaluated through the two or more instances of the channel estimation algorithm executed, a modulation rule to be used in the first multicarrier-modulation transmission section or a demodulation rule to be used in the first multicarrier reception/demodulation section, the second transmission/reception apparatus comprising:

a second multicarrier-modulation transmission section for modulating a plurality of carriers having respectively different frequencies based on the input data, and transmitting the modulated signal to the first transmission/reception apparatus;

a second multicarrier reception/demodulation section for receiving and demodulating the multicarrier-modulated signal transmitted from the first transmission/reception apparatus; and a second control section for, in response to the channel estimation algorithm executed by the first transmission/reception apparatus, evaluating transmission quality on the transmission path with respect to the frequency of each carrier and returning a result of each evaluation to the first transmission/reception apparatus, wherein the transmission path is a power line to which commercial electric power is applied, and a time interval between two adjacent instances of the channel estimation algorithm to be executed is unequal to an integer multiple of a cycle of the commercial electric power and unequal to an integer multiple of half the cycle of the commercial electric power.

12. A method for determining a set of modulation/demodulation rules to be used in first and second transmission/reception apparatuses for transmitting or receiving a multicarrier-modulated signal on a communication network, comprising:

a step performed through a cooperation of the first transmission/reception apparatus and the second transmission/reception apparatus of, if a predetermined activation condition is satisfied, executing two or more instances of a channel estimation algorithm for evaluating transmission quality on a transmission path in the communication network with respect to a frequency of each carrier, and a step of determining, based on the transmission quality evaluated through the two or more instances of the channel estimation algorithm executed, a set of modulation/demodulation rules to be used for multicarrier modulation/demodulation, wherein the transmission path is a power line to which commercial electric power is applied, and a time interval between two adjacent instances of the channel estimation algorithm to be executed is unequal to an integer multiple of a cycle of the commercial electric power and unequal to an integer multiple of half the cycle of the commercial electric power.

13. An integrated circuit to be used in a transmission/reception apparatus for transmitting a signal which is modulated based on input data to another apparatus on a communication network, and receiving a signal from another apparatus on the communication network and demodulating the received signal, comprising:

a multicarrier-modulation transmission section for modulating a plurality of carriers having respectively different frequencies based on the input data, and transmitting the modulated signal to another apparatus on the communication network;

a multicarrier reception/demodulation section for receiving a multicarrier-modulated signal transmitted from another apparatus on the communication network and demodulating the multicarrier-modulated signal; and a control section for, if a predetermined activation condition is satisfied, communicating with another apparatus on the communication network acting as a counterpart of communication, executing two or more instances of a channel estimation algorithm for evaluating transmission quality on a transmission path with respect to the frequency of each carrier, and controlling, based on the transmission quality evaluated through the two or more instances of the channel estimation algorithm executed, a modulation rule to be used in the multicarrier-modulation transmission section or a demodulation rule to be used in the multicarrier reception/demodulation section, wherein the transmission path is a power line to which commercial electric power is applied, and a time interval between two adjacent instances of the channel estimation algorithm to be executed is unequal to an integer multiple of a cycle of the commercial electric power and unequal to an integer multiple of half the cycle of the commercial electric power.

* * * * *